United States Patent
Shimizu et al.

(10) Patent No.: US 8,147,638 B2
(45) Date of Patent: Apr. 3, 2012

(54) POLARIZING PLATE AND DISPLAY USING THE SAME

(75) Inventors: Kazuyuki Shimizu, Akashi (JP); Toshiaki Shibue, Hino (JP); Takashi Murakami, Hachioji (JP)

(73) Assignee: Konica Minolta Opto Inc., Tokyo (JP)

( * ) Notice: Subject to any disclaimer, the term of this patent is extended or adjusted under 35 U.S.C. 154(b) by 0 days.

(21) Appl. No.: 12/981,399

(22) Filed: Dec. 29, 2010

(65) Prior Publication Data
US 2011/0155306 A1    Jun. 30, 2011

Related U.S. Application Data

(62) Division of application No. 11/282,086, filed on Nov. 17, 2005, now abandoned.

(30) Foreign Application Priority Data

Nov. 30, 2004  (JP) .................. 2004-345733

(51) Int. Cl.
*B29C 65/00* (2006.01)
(52) U.S. Cl. ..... 156/229; 156/242; 156/247; 156/272.2; 156/308
(58) Field of Classification Search ............. 156/242, 156/247, 229, 272.2, 308.2
See application file for complete search history.

(56) References Cited

U.S. PATENT DOCUMENTS

| | | | |
|---|---|---|---|
| 2,739,069 A * | 3/1956 | Fordyce et al. ......... | 106/170.53 |
| 5,015,851 A | 5/1991 | Singh et al. | |
| 6,559,912 B2 | 5/2003 | Aminaka | |
| 7,354,633 B2 | 4/2008 | Saito et al. | |
| 7,479,312 B2 | 1/2009 | Tamagawa et al. | |
| 2001/0026338 A1 | 10/2001 | Aminaka | |
| 2003/0170482 A1 | 9/2003 | Murakami | |
| 2003/0218709 A1 | 11/2003 | Ito et al. | |
| 2004/0001175 A1 | 1/2004 | Ito | |
| 2006/0181774 A1 | 8/2006 | Ojima et al. | |

FOREIGN PATENT DOCUMENTS

| | | |
|---|---|---|
| JP | 2002-14230 A | 1/2002 |
| JP | 2002-71955 A | 3/2002 |
| JP | 2002-098832 A | 4/2002 |
| JP | 2002-307550 A | 10/2002 |
| JP | 2004-279931 A | 10/2004 |

OTHER PUBLICATIONS

Japanese Office Action mailed Aug. 17, 2010 in Japanese Patent Application No. 2005-332685.

* cited by examiner

*Primary Examiner* — Khanh P Nguyen
*Assistant Examiner* — Margaret Squalls
(74) *Attorney, Agent, or Firm* — Holtz, Holtz, Goodman & Chick, PC

(57) ABSTRACT

A polarizing plate comprising a polarizing film having thereon a retardation film containing a plasticizer and a cellulose ester, wherein a free volume radius of the retardation film determined by positron annihilation lifetime spectroscopy is in the range of 0.250-0.310 nm.

4 Claims, 1 Drawing Sheet

POLARIZING PLATE AND DISPLAY USING THE SAME

CROSS-REFERENCE TO RELATED APPLICATIONS

This application is a Divisional Application of U.S. application Ser. No. 11/282,086 filed Nov. 17, 2005 now abandoned, which is based on Japanese Patent Application No. 2004-345733 filed on Nov. 30, 2004 in Japanese Patent Office, the entire content of each of which is hereby incorporated by reference.

FIELD OF THE INVENTION

The present invention relates to a polarizing plate and a display using the same, and specifically, relates to a polarizing plate having small variation in retardation values due to change in production conditions, and to a display using the same.

BACKGROUND OF THE INVENTION

A large sized liquid crystal display (LCD) has recently attracted attention. With respect to large-sized LCDs, required therein is higher performance, for example, in viewing angle, contrast and stability in quality against environmental changes, compared to the required performance for conventional personal notebook computers or LCD monitors. Therefore, higher performance is also required for the polarizing plates used for the large sized LCD device or for the cellulose ester film used for the polarizing plate. Variations in retardation values have been observed in polarizing plates having thereon a retardation film, due to planned or unplanned changes in production conditions. Improvement for this problem has been desired specifically for large sized polarizing plates. Further, in order to improve the display performance of an LCD, a backlight unit has more commonly been provided behind the liquid crystal cell to directly illuminate the liquid crystal cell without using a light guide. However, in this direct illumination backlight system, when a LED backlight unit is used instead of a fluorescence tube backlight unit, variations in display quality tends to increase in accordance with the temperature increase caused by heat generated from the LED backlight unit, and further improvement specifically for obtaining displays exhibiting uniform contrast has been desired.

In order to obtain a display exhibiting long term stability of display quality and high productivity, disclosed is a retardation film of which moisture permeability is reduced (for, example, refer to Patent Document 1). Also, in order to obtain a display exhibiting limited light leakage caused by thermal distortion and high display quality, disclosed is a retardation film of which expansion coefficient due to moisture absorption is suppressed below a prescribed value (for example, refer to Patent Document 2). A polarizing plate exhibiting high durability even under a high humidity-high temperature condition is also disclosed, which is attained by controlling the diffusion coefficient of boric acid in the polarizing plate (for example, refer to Patent Document 3). However, these, improvements have not been fully satisfactory. In Patent Document 3, disclosed is a method to control the diffusion coefficient of boric acid by decreasing free volume in a cellulose acylate film, and in paragraph [0015] of this patent document, it is described that the free volume in a cellulose acylate film can be decreased by increasing the amount of crystals in the film. However, variations of retardation values of polarizing plates due to changes in producing conditions have not been fully reduced so far. Specifically, in an amorphous-like cellulose ester, for example, a mixed acid ester of cellulose such as cellulose acetate propionate, a notable effect has not been fully obtained.

Patent Document 1: Japanese Patent Publication Open to Public Inspection (hereafter referred to as JP-A) No. 2002-14230

Patent Document 2: JP-A No. 2002-71955

Patent document 3: JP-A No. 2004-279931

SUMMARY OF THE INVENTION

An object of the present invention is to provide a polarizing plate having on one surface of which a retardation film, the polarizing plate exhibiting reduced variation in retardation values due to changes in production conditions and to provide a display exhibiting uniform display quality. One of the aspects of the present invention to achieve the above object is a polarizing plate comprising a polarizing film having thereon a retardation film containing a plasticizer and a cellulose ester, wherein a free volume radius of the retardation film determined by positron annihilation lifetime spectroscopy is in the range of 0.250-0.310 nm.

DESCRIPTION OF THE PREFERRED EMBODIMENTS

Figure 1:
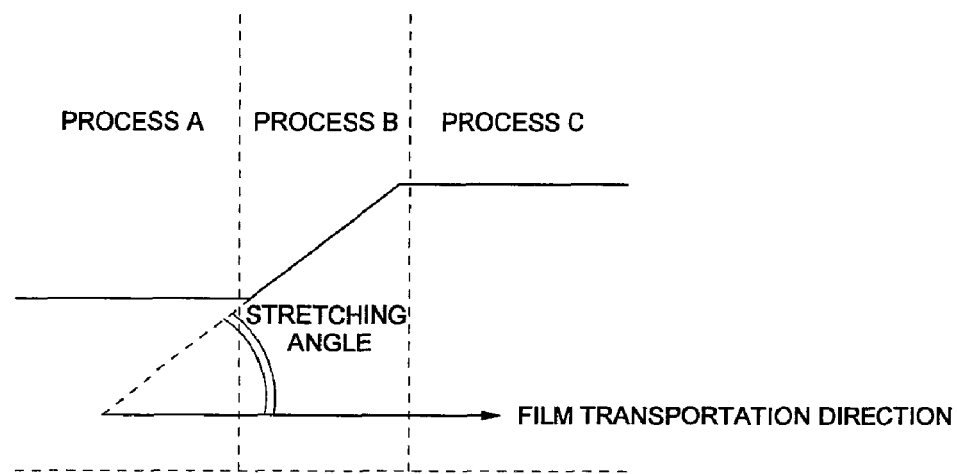
FIG. 1 is a diagram explaining the stretching angle in a stretching process.

The above object of the present invention is attained by the following structures.

(1) A polarizing plate comprising a polarizing film having thereon a retardation film containing a plasticizer and a cellulose ester, wherein a free volume radius of the retardation film determined by positron annihilation lifetime spectroscopy is in the range of 0.250-0.310 nm.

(2) The polarizing plate of Item (1), wherein a free volume parameter of the retardation film is in the range of 1.0-2.0.

(3) The polarizing plate of Item (1) or Item (2), wherein the cellulose ester is an ester of mixed aliphatic carboxylic acids each having 2-22 carbon atoms.

(4) The polarizing plate of any one of Items (1) to (3), wherein

Ro and Rt defined by the following formulas satisfy the following conditions:

Ro is in the range of 30-300 nm; and

Rt is in the range of 70-400 nm, wherein $$Ro = (nx - ny) \times d$$

$$Rt = (((nx + ny)/2) - nz) \times d$$

wherein Ro represents an in-plane retardation value; Rt represents an out-of-plane retardation value in a thickness direction; nx represents an in-plane refractive index in a slow axis direction; ny represents an in-plane refractive index in a fast axis direction; nz represents an out-of-plane refractive index in the thickness direction; and d represents a thickness (nm) of the retardation film.

(5) A display comprising a liquid crystal cell, a direct illumination backlight unit and the polarizing plate of any one of Items (1) to (4).

The present invention provides a polarizing plate having on one surface of which a retardation film, the polarizing plate exhibiting reduced variation in retardation values due to changes in production conditions and provides a display exhibiting uniform display quality.

The preferred embodiments of the present invention will now be detailed, however, the present invention is not limited thereto.

The characteristics of the structures of the present invention are as follows.

(6) A stretched cellulose ester film containing a plasticizer and a cellulose ester and having a free volume radius determined by positron annihilation lifetime spectroscopy in the range of 0.250-0.310 nm.

(7) The stretched cellulose ester film of Item (6) having a free volume parameter determined by positron annihilation lifetime spectroscopy in the range of 1.0-2.0.

(8) The stretched cellulose ester film of Item (6) or Item (7), wherein the cellulose ester is an ester of mixed carboxylic acids having 2-22 carbon atoms.

(9) The stretched cellulose ester film of any one of Items (6) to (8), wherein the cellulose ester is cellulose acetate propionate or cellulose acetate butyrate.

(10) The stretched cellulose ester film of any one of Items (6) to (9), wherein Ro is in the range of 30-300 nm and Rt is in the range of 70-400 nm.

(11) The stretched cellulose ester film of any one of Items (6) to (10), wherein a dimensional variation of the cellulose ester film after it is stored under a condition of 80° C. and 90% RH is within ±2%.

(12) A polarizing plate having thereon a retardation film containing a plasticizer and a cellulose ester, wherein
a free volume radius of the retardation film determined by positron annihilation lifetime spectroscopy is in the range of 0.250-0.310 nm.

(13) The polarizing plate of Item (12), wherein a free volume parameter of the retardation film determined by positron annihilation lifetime spectroscopy is in the range of 1.0-2.0.

(14) The polarizing plate of Item (12), wherein a free volume parameter of the retardation film determined by positron annihilation lifetime spectroscopy is in the range of 1.2-1.8.

(15) The polarizing plate of any one of Items (12) to (14), wherein the cellulose ester is an ester of mixed carboxylic acids having 2-22 carbon atoms.

(16) The polarizing plate of any one of Items (12) to (15), wherein Ro is in the range of 20-300 nm and Rt is in the range of 70-400 nm.

(17) The polarizing plate of any one of Items (12) to (16), wherein a dimensional variation of the retardation film after it is stored under a condition of 80° C. and 90% RH is within ±2%.

(18) A polarizing plate having thereon a stretched cellulose ester film containing a plasticizer and a cellulose ester, wherein
a free volume radius of the stretched cellulose ester film determined by positron annihilation lifetime spectroscopy is in the range of 0.250-0.310 nm;
a free volume parameter of the stretched cellulose ester film determined by positron annihilation lifetime spectroscopy is in the range of 1.0-2.0;
the stretched cellulose ester film is produced by heat treating the film at 105-150° C. under a rate of atmosphere replacement ratio of 12 times/h or more, after the film is dried until an amount of residual solvent decreases to less than 0.3%.

(19) A liquid crystal display having a direct illumination backlight unit and the polarizing plate of any one of Items (12) to (18).

(20) A method for producing a retardation film containing the steps of:
casting a dope containing a plasticzer and a cellulose ester on a support to form a web;
peeling the web from the support;
stretching the web while the web still contains a solvent;
further drying the web until an amount of residual solvent decreases to 0.3%; and
heat treating the web at 105-155° C. under a rate of atmosphere replacement of 12 times/h or more or more preferably 12-45 times/h while the web is transported, to obtain a prescribed free volume radius and a prescribed free volume parameter.

The characteristics of the present invention will now be described.

One of the aspects of the present invention is a polarizing plate having on one surface of which a retardation film containing a plasticizer and a cellulose ester, wherein a free volume radius of the retardation film determined by positron annihilation lifetime spectroscopy is in the range of 0.250-0.310 nm. Further, it is preferably the polarization plate having the retardation film of which a free volume parameter 1.0-2.0.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

<Measurement of Free Volume Radius by Positron Annihilation Lifetime Spectroscopy, and Free Volume Parameter>

A positron annihilation lifetime and relative intensity were measured under the following measurement condition.

(Measurement Condition)
Positron source: 22NaCl (intensity: 1.85 MBq)
Gamma-ray detector: Plastic scintillator+Photomultiplier tube.
Apparatus time resolution: 290 ps
Measurement temperature: 23° C.
Total number of counts: 1 million counts
Specimen size: 20 mm×15 mm×2 mm
20 pieces of 20 mm×15 mm sized films were piled to prepare an about 2 mm thick sample. The sample was dried under vacuum 24 hours.
Irradiation area: About 10 mm in diameter
Time per channel: 23.3 ps/ch According to the above measurement condition, positron annihilation lifetime spectroscopy was carried out. Using a nonlinear least-square method, three components of cellulose ester films were analyzed. When the annihilation times were referred to as, in small order, $\tau_1$, $\tau_2$ and $\tau_3$ and the corresponding intensities were referred to as $I_1$, $I_2$ and $I_3$ ($I_1+I_2+I_3=100\%$), respectively, using the largest annihilation time $\tau_3$, a free volume radius $R_3$ (nm) was determined using the following formula. The larger the $\tau_3$ value is, the larger the free volume is estimated to be.

$$\tau_3 = (1/2)[1 - \{(R_3/(R_3+0.166)\} + (1/2\pi)\sin\{2\pi R_3/(R_3+0.166)\}]^{-1}$$

where, 0.166 (nm) represents the thickness of the electronic layer which is exuding from the wall of a hole.

The free volume parameter VP was determined by the following formula.

$$V3 = \{(4/3)\pi(R3)^3\} (nm^3)$$

$$VP = I3(\%) \times V3 \ (nm^3)$$

Since I3(%) is equivalent to the relative number concentration of a hole here, VP is equivalent to the relative amount of holes.

The above measurements were repeated twice and the mean values were calculated for the determination.

Evaluation of a free volume in polymer by positron annihilation spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

The free volume radius of the retardation film of the present invention is preferably 0.250-0.310 nm and is more preferably 0.270-0.305 nm. In an industrial process, it is rather difficult to produce a cellulose ester retardation film having a free volume radius of less than 0.250 nm or a free volume parameter less than 1.0. The retardation film of the present invention having a free volume radius of 0.250-0.310 nm is preferable since it enables the effect of the present invention. However, in the retardation films prepared by the conventional preparation method, it has been difficult to find a retardation film having a free volume radius of not more than 0.31 nm. The free volume parameters are preferably in the range of 1.0-2.0, and more preferably in the range of 1.2-1.8. When the free volume parameter is less than 1.8, patch of retardation becomes difficult to occur.

The method to control the free volume radius and the free volume parameter of a retardation film containing a plasticizer and a cellulose ester, within the prescribed ranges is not specifically limited, however, they may be controlled by the following method.

A retardation film having a free volume radius of 0.250-0.310 and a free volume parameter of 1.0-2.0 determined by positron annihilation lifetime spectroscopy is obtained by a method containing the steps of:

casting a dope containing a plasticizer and a cellulose ester on a support to form a web;

peeling the web from the support;

stretching the web while the web still contains a solvent;

further drying the web until an amount of residual solvent decreases to 0.3%; and heat treating the web at 105-155° C. under a rate of atmosphere replacement of 12 times/h or more or more preferably 12-45 times/h while the web is transported.

The rate of atmosphere replacement is the number of times replacing the atmosphere of a heat treatment chamber by fresh-air per unit time, provided that the volume of the heat treatment chamber is expressed as V (m³) and the amount of fresh-air sent to the heat treatment chamber is expressed as FA (m³/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

$$\text{Rate of atmosphere replacement} = FA/V (\text{times}/h)$$

When the heat treatment temperature exceeds 155° C., or when it is lower than 105° C., the effect of the present invention tends not be acquired.

As the operating temperature, it is still more preferable that the operating temperature is in the range of 110-150° C. Further, preferable is that the heat treatment is carried out under the condition in which the rate of atmosphere replacement is 12 times/h or more. When it is less than 12 times/h, the effect of the present invention tends not to be acquired.

When the rate of atmosphere replacement is 12 times/h or more, the concentration of the plasticizer evaporated from the retardation film in the atmosphere is thoroughly reduced, accordingly, re-deposition of the plasticizer to the retardation film is also reduced. This is assumed to contribute in attaining the effect of the present invention.

When the rate of atmosphere replacement is increased more than necessary, the production cost increases and due to the fluttering of the web, retardation patch increases. Accordingly, it is not recommended that the rate of atmosphere replacement is increased more than necessary, however, after the web was thoroughly dried and the amount of residual solvent is considerably decreased, it can be increased. However, the rate of atmosphere replacement of 45 times/h or more is not practical since the production cost drastically increases. The heat treatment under the rate of atmosphere replacement of 12 times/h or more is preferably carries out within 1 minute-1 hour. If the treatment time is less than 1 minute, the free volume radius within a prescribed range may be difficult to obtain, while, when it is not more than 1 hour, the change of retardation value is allowable.

Further, in this process, a pressurizing treatment of the retardation film in the thickness direction may also be effectively carried out to control the free energy volume radius and the free volume parameter within more preferable range. The pressure is preferably 0.5–10 kPa. The amount of residual solvent at the stage when the pressurizing treatment is carried out is preferably less than 0.3. At 0.3% or more, the effect of the present invention cannot fully be reduced, although flatness of the retardation film may be improved.

When a retardation film is not subjected to the above mentioned treatments, the free volume radius may become larger than 0.315.

The present invention will now be further detailed, however; the present invention is not limited thereto.

<Cellulose Ester>

The number average molecular weight (Mn) of the cellulose ester used for the present invention is preferably 80000-200000. It is more preferably 100000-200000 and still more preferably 150000-200000.

The ratio of weight average molecular weight (Mw) to number average molecular weight (Mn), Mw/Mn, of the cellulose ester used for the present invention is preferably in the range of 1.2-3.0, and more preferably in the range of 1.7-2.2.

The average molecular weight and the molecular weight distribution of cellulose ester can be measured by a well-known method using high performance liquid chromatography. A number average molecular weight and weight-average molecular weight can be calculated using these values, and the ratio (Mw/Mn) can be calculated.

The measurement condition is as follows.

Solvent: Methylene chloride

Column: Shodex K806, K805, K803G (produced by Showa Denko K.K.)

Column temperature: 25° C.

Sample concentration: 0.1% by weight

Detector: RI Model 504 (produced by GL Sciences Inc.)

Pump: L6000 (produced by Hitachi, Ltd.)

Feed rate: 1.0 ml/min

Calibration: Standardized polystyrene STK Standard Polystyrene (made by TOSOH CORP.). A calibration curve is drawn by using 13 samples in the range of Mw 1,000,000-500. The intervals in Mw values among the 13 samples are preferably equal.

An aliphatic-carboxylic-acid ester, an aromatic-carboxylic-acid ester or a mixed carboxylic acid ester thereof having from 2 to around 22 carbon atoms is preferably used for the cellulose ester of the present invention, since the effect of the present invention is notably acquired.

Specifically, a lower fatty acid ester of cellulose is preferable, wherein the lower fatty acid represents a fatty acid having 6 carbon atoms or less. Examples of a specific lower fatty acid ester of cellulose include: cellulose acetate, cellulose propionate, cellulose butyrate, cellulose acetate phthalate and mixed fatty acid esters, for example, cellulose acetate propionate and cellulose acetate butylate, which are disclosed in JP-A No. 10-45804, No. 8-231761 and U.S. Pat. No. 2,319,052. Of these, cellulose acetate propionate, cellulose acetate butylate, and cellulose acetate propionate butyrate are specifically preferable as the lower fatty acid ester of cellulose of the present invention. These cellulose esters may also be used in combination. Since these cellulose esters are amorphous-like, unlike cellulose triacetate, they are specifically preferably used in the present invention.

The total acylation degree is preferably in the range of 2.4-2.9. The cellulose ester of the present invention specifically preferably contains an acyl group having 2-22 carbon atoms as a substituent and satisfies the following Formulas (I) and (II), provided that X represents an acetylation degree and Y represents an substitution degree with an acyl group having 3-22 carbon atoms:

$$2.4 \leq X+Y \leq 2.9 \quad \text{Formula (I)}$$

$$0 \leq X \leq 2.5 \quad \text{Formula (II)}$$

Among these, specifically preferable is cellulose acetate propionate with $1.7 \leq X \leq 2.5$ and $0.1 \leq Y \leq 1.2$ (total substitution degree is represented by X+Y). The part which is not replaced with an acyl group generally exists as a hydroxyl group. These compound are prepared by a known method in the art.

The acylation degree of a cellulose ester is determined according to the method specified in ASTM-D 817-96.

Cellulose ester is prepared using cotton linter, wood pulp or kenaf as starting materials which may be used alone or in combination. It is specifically preferable to use a cellulose ester prepared from cotton linter (hereafter merely referred to as linter) or from wood pulp alone or in combination.

These cellulose esters may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

In the case of an acetyl cellulose, it is necessary to prolong the acetylation duration in order to obtain a higher degree of acetylation, however, a too long acetylation duration may result in a undesirable reaction such as cutting off of a polymer chain or a decomposition of an acyl group. Accordingly, the acetylation duration should be limited within an appropriate range, however, specifying a degree of acetylation with an acetylation duration is not fully recommended because the acetylation conditions differ when a different reactor or different equipment is utilized. In general, during decomposition of a polymer, the distribution of the molecular weight increases, so that, also in the case of a cellulose ester, the degree of decomposition can be specified by the commonly used Mw/Mn value, where Mw represents a weight average molecular weight and Mn denotes a number average molecular weight. Namely, the Mw/Mn value can be used as one of the parameters representing the degree of acetylation reaction at which the decomposition of the polymer has not been excessive and, at the same time, sufficient acetylation has already been achieved.

An example of a preparation method of cellulose ester is described below. Cotton linter of 100 weight parts as a starting material of cellulose was crushed, and after adding 40 weight parts of acetic acid, the system was pretreated for activation at 36° C. for 20 minutes. Thereafter, 8 weight parts of sulfuric acid, 260 weight parts of acetic anhydride and 350 weight parts of acetic acid were added, after which esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with adding ten times of an acetic acid solution (acetic acid/water=1/1, based on weight ratio) at ambient temperature for 160 minutes, the resulting solution was filtered and dried to obtain a purified acetyl cellulose having an acetyl substitution degree of 2.75. The obtained acetyl cellulose exhibited Mn of 92,000, Mw of 156,400, and Mw/Mn of 1.7. In a similar manner, cellulose esters having different substitution degrees and different Mw/Mn ratios can be synthesized by controlling the esterification conditions of cellulose ester (temperature, duration and stirring rate) as well as hydrolysis conditions. Removal of low molecular weight component by refining and removal of non-acetized component by filtering from the prepared cellulose ester are also preferably carried out.

For the prepared cellulose ester, the following treatments are preferably carried out, namely, (i) removal of low molecular weight portion by refining; or (ii) removal of unacetylated portion or low-acetylated portion by filtering.

Further, a cellulose ester of mixed acids can be prepared by a reaction employing the method described in JP-A 10-45804. The acyl substitution degree can be measured according to the definition of ASTM-D817-96.

The properties of a cellulose ester are influenced by residual amounts of metal components which may be originated from the water used in the manufacturing process. Metal components which may cause insoluble cores should preferably be minimal. Metal ions of iron(Fe), calcium(Ca), magnesium(Mg) and other metals may form insoluble cores by forming salts in combination with decomposition products of polymers which may possibly contain organic acid groups. Accordingly these metal ions should be minimal. The amount of iron is preferably less than 1 ppm. Calcium easily forms a coordinated compound, namely a complex, with acid components such as carbonic acid, sulfuric acid, or with various ligands, and causes much insoluble scum (insoluble residue and turbidity).

The preferable amount of calcium is commonly less than 60 ppm, and is more preferably from 0 to 30 ppm. Too much magnesium may also cause insoluble residue, and the preferable amount is from 0 to 70 ppm, more preferably from 0 to 20 ppm. After an absolutely dry cellulose ester film is treated with a microdigest wet-decomposer (sulfuric acid-nitric acid decomposing) followed by being subjected to alkali fusion, the amounts of iron, calcium, magnesium are determined by means of IPC-AES (Inductively Coupled Plasma-Atomic Emission Spectroscopy).

<Plasticizers>

The total content of one or more plasticizers contained in the retardation film of the present invention is preferably 1-20% by weight and more preferably 3-18% by weight based on the total solid amount of the retardation film.

The plasticizer used in the retardation film of the present invention is not specifically limited. However, examples of a preferable plasticizer include: a phosphate plasticizer, a glycolate plasticizer, a citrate plasticizer, a phthalate plasticizer, a polyalcohol ester plasticizer, a polycarboxylate plasticizer, a fatty acid ester plasticizer, a polyester plasticizer and a polyuretane plasticizer.

Examples of a phosphate plasticizer include: triphenyl phosphate, tricresyl phosphate, cresyl diphenyl phosphate, octyl diphenyl phosphate, diphenyl biphenyl phosphate, trioctyl phosphate and tributyl phosphate. As for a glycolate plasticizer, alkylphthalylalkyl glycolates are preferably used. Examples of an alkylphthalylalkyl glycolate include: methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate; octylphthalylmethyl glycolate and octylphthalylethyl glycolate.

Examples of a phthalate plasticizer include: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

Examples of a citrate plasticizer include: acetyltrimethyl citrate, acetyltriethyl citrate and acetyltributyl citrate.

Examples of a fatty acid ester plasticizer include: butyl oleate, methylacetyl ricinoleate and dibutyl sebacate.

A polycarboxylate plasticizer is also used preferably. It is preferable to add one of polycarboxylates disclosed in JP-A No. 2002-265639, paragraph number [0015]-[0020] as a plasticizer.

Under the circumstances of high temperature and high humidity, when additives, such as a plasticizer, deposit and volatilize out of a film, the property of loosing the film weight is referred to as volatility. In the conventional cellulose ester film, this volatility has been large resulting in lowing the function of the display. In the present invention, the volatility under a condition of 80° C. and 90% RH is preferably not more than ±2% by weight based on the total weight of the plasticizer.

Examples of a plasticizer exhibiting volatility under a condition of 80° C. and 90% RH of ±2% by weight include: a poly alcohol ester plasticizer, a polyester plasticizer and a polyuretane plasticizer.

A polyalcohol ester plasticizer is a plasticizer containing an ester of an aliphatic polyalcohol having a valence of two or more and a monocarboxylic acid, and it preferably contains an aromatic ring or a cycloalkyl ring in the molecule. It is preferably an aliphatic polyalcohol ester having a valence of 2-20.

The polyalcohol used for the present invention is represented with the following general formula (i).

$$R_1—(OH)_n \quad \text{General formula (i)}$$

wherein, $R_1$ represents an organic group having a valence of n, n represents a positive integer of two or more, and an OH group represents alcoholic or a phenolic hydroxyl group. It is preferable that the number of carbon atoms of the polyalcohol are five or more. Examples of preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, but the invention is not limited thereto. Specifically, triethylene glycol, tetraethylene glycol, dipropylene glycol, tripropylene glycol, sorbitol, trimethylol propane and xylitol are preferable.

As the monocarboxylic acid to be used in the polyalcohol ester, a known aliphatic monocarboxylic acid, alicyclic monocarboxylic acid and aromatic monocarboxylic acid may be employed, though the monocarboxylic acid is not specifically limited. Specifically, aliphatic monocarboxylic acid and aromatic monocarboxylic acid are preferable, because the moisture permeability and the volatility are reduced.

Examples of the preferable monocarboxylic acid are listed below but the invention is not limited thereto.

A straight or branched chain carboxylic acid having 1 to 32 carbon atoms is preferably employed. The number of carbon atoms is more preferably from 1-20, and specifically preferably from 1-10. The addition of acetic acid is preferable for raising the compatibility with a cellulose ester, and the mixing of acetic acid with another carboxylic, acid is also preferable.

As the preferable aliphatic monocarboxylic acid, saturated fatty acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid can be exemplified.

Examples of preferable alicyclic carboxylic acid include cyclopentene carboxylic acid, cyclohexane carboxylic acid, cyclooctane carboxylic acid and derivatives thereof.

Examples of preferable aromatic carboxylic acid include ones formed by introducing an alkyl group into the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives of them, and benzoic acid is specifically preferable.

The molecular weight of the polyalcohol is preferably from 300 to 1,500, and more preferably from 350 to 1000 though the molecular weight is not specifically limited. Larger molecular weight is preferable for storage ability, while smaller molecular weight is preferable for compatibility with cellulose ester.

The carboxylic acid to be employed in the polyalcohol ester may be one kind or a mixture of two or more kinds of them.

Concrete examples of the polyalcohol ester are listed below.

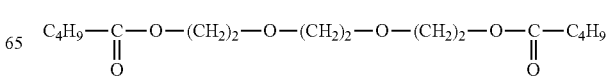

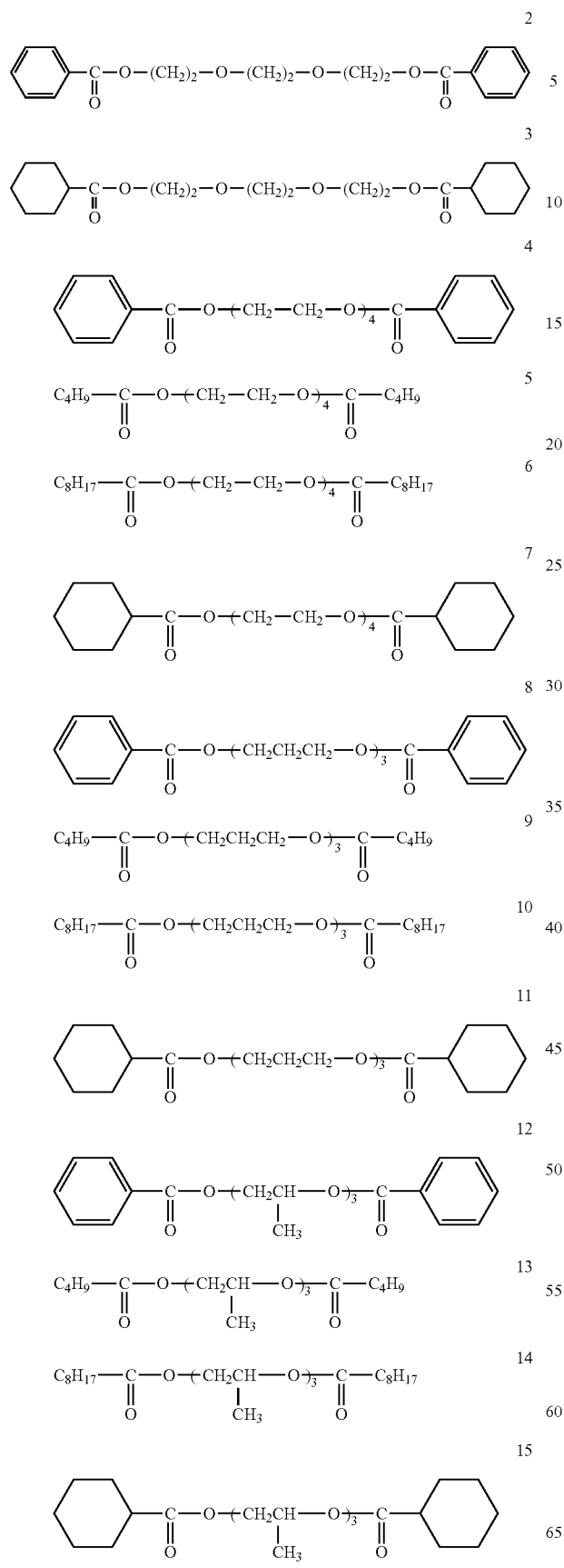

21
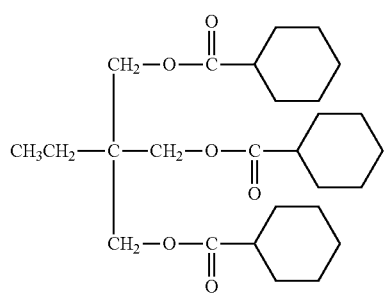
22
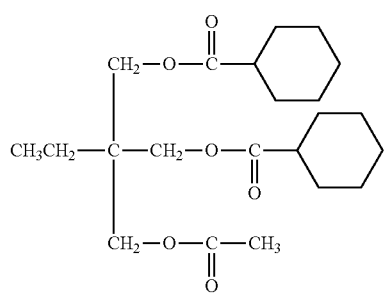
23
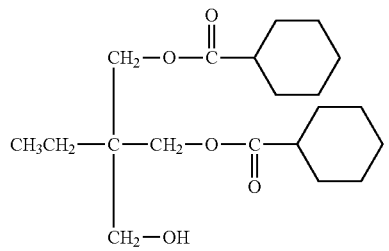
24
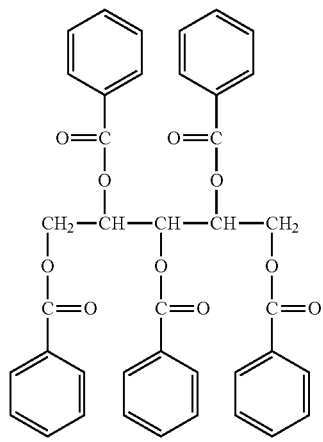
25
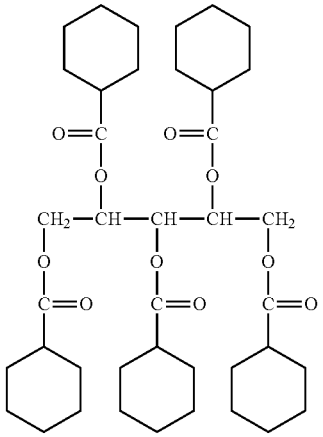
26
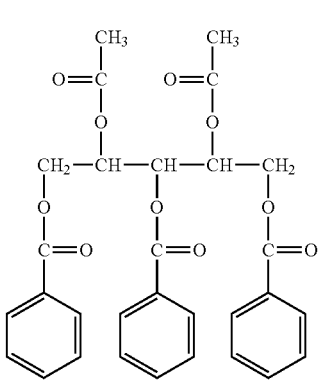
27
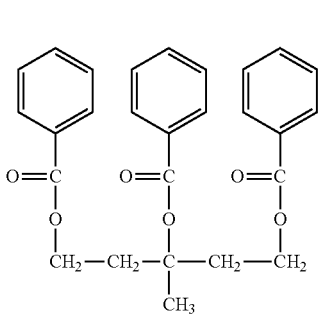
28
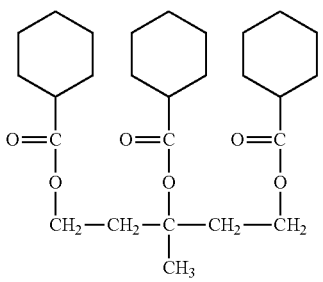

29

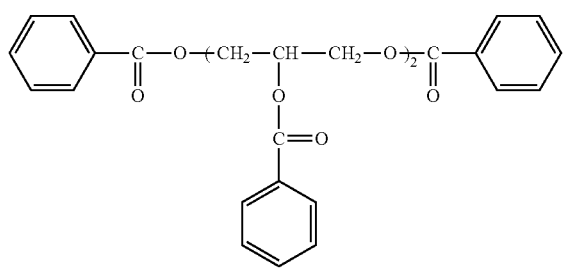

30

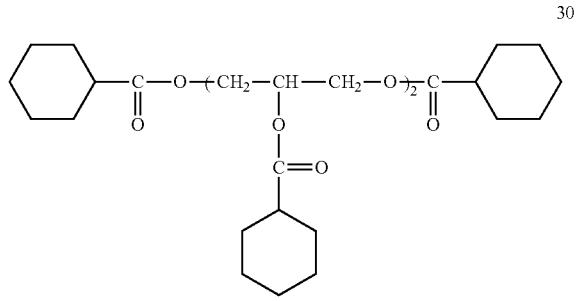

31

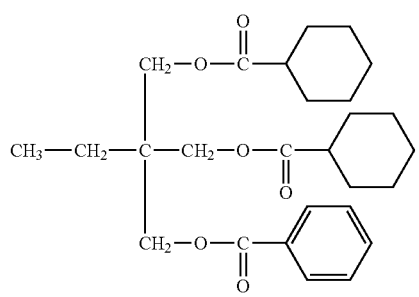

32

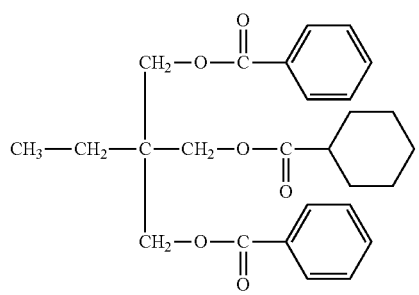

33

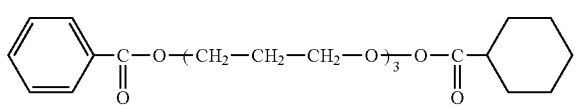

34

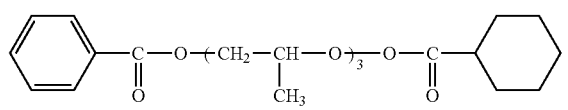

35

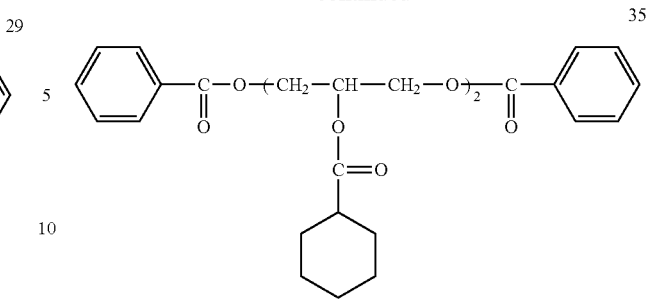

Polyester plasticizers disclosed in JP-A No. 2002-22958, paragraph numbers [0051]-[0056] are used in the present invention. Polyurethane plasticizers disclosed in JP-A No. 2003-171499, paragraph numbers [0031]-[0039] are also preferable.

Further, the aromatic terminal ester plasticizers represented by Formula (I) are also preferable.

$$B\text{-}(G\text{-}A)_n\text{-}G\text{-}B \qquad \text{Formula (I)}$$

where B represents benzene monocarboxylic acid group, G represents an alkylene glycol group having 2-12 carbon atoms or an oxyalkylene glycol group having 4-12 carbon atoms, A represents an alkylene dicarboxylic acid having 4-12 carbon atoms, and n represents an integer of 0 or more. A compound represented by Formula (I) is prepared through a reaction similar to the preparation reaction of a common polyester plasticizer.

Examples of a benzene monocarboxylic acid component of the aromatic terminal ester of the present invention include: benzoic acid, p-tert-butyl benzoic acid, otoluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the aromatic terminal ester of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids.

The number average molecular weight of the aromatic terminal ester used in the present invention is preferably 250-2000, and more preferably 300-1500. The acid value of the aromatic terminal ester used in the present invention is preferably not more than 0.5 mgKOH/g and more preferably not more than 0.3 mgKOH/g. The hydroxyl value of the aromatic terminal ester used in the present invention is preferably not more than 25 mgKOH/g and more preferably not more than 15 mgKOH/g.

(Acid Value and Hydroxyl Value of Aromatic Terminal Ester)

"Acid value" means the milligrams of potassium hydroxide required to neutralize the acid (carboxyl group existing in a specimen) included in 1 g of sample. Alternatively, "hydroxyl value" means the milligrams of potassium hydroxide required to neutralize the acetic acid bonded to the hydroxyl groups after acetylation of 1 g of sample. The acid value and the hydroxyl value are measured based on JIS K0070.

Examples of a synthetic method of an aromatic terminal ester plasticizer are shown below:

<Sample No. 1 (Aromatic Terminal Ester Sample)>

In a container, 365 weight parts (2.5 moles) of adipic acid, 418 weight parts (5.5 moles) of 1,2-propylene glycol, 610 weight parts (5 moles) of benzoic acid and 0.30 weight part of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to 100 mmHg and, finally, to 3 mmHg at 200-230° C., while the distillate was removed. The product was filtered to obtain an aromatic terminal ester having the following features:

Viscosity (25° C.): 815 mPa·s
Acid value: 0.4

<Sample No. 2 (Aromatic Terminal Ester Sample)>

An aromatic terminal ester having the following features was prepared in the same manner as Sample No. 1 except that 365 weight parts (2.5 moles) of adipic acid, 610 weight parts (5 moles) of benzoic acid, 583 weight parts (5.5 moles) of diethylene glycol and 0.45 weight part of tetra-isopropyl titanates (as a catalyst) were used.

Viscosity (25° C.): 90 mPa·s
Acid value: 0.05

<Sample No. 3 (Aromatic Terminal Ester Sample)>

An aromatic terminal ester having the following features was prepared in the same manner as Sample No. 1 except that 365 weight parts (2.5 moles) of adipic acid, 610 weight parts (5 moles) of benzoic acid, 737 weight parts (5.5 moles) of dipropylene glycol and 0.40 weight part of tetra-isopropyl titanates (as a catalyst) were used.

Viscosity (25° C.): 134 mPa·s
Acid value: 0.03

Among these plasticizers, preferably two or more plasticizers are contained in the retardation film of the present invention, whereby loss of plasticizer from the retardation film is reduced. The reason is not fully clear, however, it is because (i) the amount of one kind of plasticizer can be decreased; and (ii) an interaction between the two plasticizers or between a plasticizer and cellulose ester may have suppressed loss of plasticized from the retardation film.

<UV Absorbing Agent>

The cellulose ester film of the present invention preferably contains a UV absorbing agent in order to improve the durability of an LCD by absorbing UV rays of which wavelength is 400 nm or less. The transmittance at a wavelength of 370 nm is preferably not more than 10 percent and is more preferably not more than 5 percent and still more preferably not more than 2 percent.

Examples of a UV absorbing agent used in the present invention include: oxybenzophenone, benzotriazol, salicylic acid ester, benzophenone, cyanoacrylate, triazine, nickel complex salt and inorganic particles.

UV absorbing agents preferably used in the present invention include a benzotriazole UV absorbing agent and a benzophenone UV absorbing agent, both of which are extremely transparent and have a superior effect of preventing degradation of the polarizing plate or liquid crystal display. Among these, a benzotriazole UV absorbing agent having reduced coloring is specifically preferable. Specific examples of a UV absorbing agent include TINUVIN 109, TINUVIN 171, TINUVIN 326, TINUVIN 327 and TINUVIN 328 which are manufactured by Chiba Specialty Chemicals Co. However, the present invention is not limited thereto.

For example, as a benzotriazole UV absorbing agent, the compound represented by the following Formula (A) is applicable.

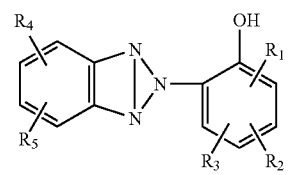

Formula (A)

wherein $R_1$, $R_2$, $R_3$, $R_4$, and $R_5$ may be the same or may be different, and each represent a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono or di alkylamino group, an acylamino group, or a heterocyclic group of 5-6 member; and R4 and R5 may be combined to form a 5-6 membered ring.

Each of the above mentioned groups may have an arbitrary substituent.

Examples of an UV absorbing agent used for the present invention is given to below, however, the present invention is not limited thereto.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chloro benzotriazole
UV-5: 2-(2'-hydroxy-3'-(3",4",5",6"-tetrahydro phthalimidomethyl)-5'-methylphenyl)benzotriazole
UV-6: 2,2-methylenebis(4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole
UV-8: 2-(2H-benzotriazole-2-yl)-6-(n- and iso-dodecyl)-4-methylphenol (TINUVIN171, product of Ciba Specialty Chemicals Inc.)
UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H$_7$ benzotriazole-2-yl)phenyl]propionate (TINUVIN109, product of Ciba Specialty Chemicals Inc.)

Further, examples of the UV absorbing agents preferably used in the present invention include a benzophenone UV absorbing agent and a triazine UV absorbing agent, of these, a triazine UV absorbing agent is specifically preferable.

As a benzotriazole UV absorbing agent, the compound represented by the following Formula (B) is preferably used.

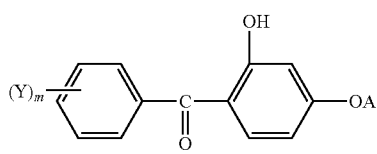

Formula (B)

wherein Y represents a hydrogen atom, a halogen atom, an alkyl group, an alkenyl group, an alkoxyl group, or a phenyl group, of these, the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or —CO(NH)$_n$-1-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include, for example: a halogen atom such as a chlorine atom, a bromine atom and a fluorine atom, a hydroxyl group and a phenyl group (the phenyl group may further have an alkyl group or a halogen atom as a substituent).

Specific examples of a benzophenone related compound represented by Formula (B) are shown below, however, the present invention is not limited thereto.
UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

A compound having a 1,3,5-triazine ring is also preferably used as an UV absorbing agent of the optical film of the present invention.

Among the compounds having a 1,3,5-triazine ring, specifically preferable is a compound represented by Formula (C).

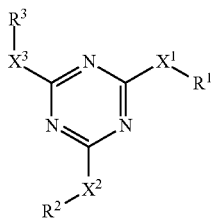

Formula (C)

wherein $X_1$ represents a single bond, —NR$_4$—, —O—, or —S—.; $X_2$ represents a single bond, —NR—, —O—, or —S—.; $X_3$ represents a single bond, —NR$_6$—, —O—, or —S—.; $R_1$, $R_2$, and $R_3$ each represents an alkyl group, an alkenyl group, an aryl group, or a heterocyclic group.; and $R_4$, $R_5$, and $R_6$ each represents a hydrogen atom, an alkyl group, an alkenyl group, an aryl group, or a heterocyclic group. The compound represented by Formula (C) is preferably a melamine compound.

With respect to a melamine compound, in Formula (C), $X_1$, $X_2$, and $X_3$ are —NR$_4$—, —NR$_5$—, and —NR$_6$—, respectively, or $X_1$, $X_2$, and $X_3$ each is a single bond; and $R_1$, $R_2$, and $R_3$ each is a heterocyclic group which have a free radical in a nitrogen atom. Further, —X$_1$—R$_1$, —X$_2$—R$_2$, and —X$_3$—R$_3$ are preferably the same substituent. $R_1$, $R_2$, and $R_3$ each is specifically preferably an aryl group and $R_4$, $R_5$, and $R_6$ each is specifically preferably a hydrogen atom.

The above alkyl group is more preferably a chain alkyl group than a cyclic alkyl group and a linear chain alkyl group is more preferable than a branched chain alkyl group.

The number of carbon atoms in an alkyl group is preferably 1-30, more preferably, 1-20, further more preferably 1-10, still more preferably 1-8, and the most preferably 1-6. The alkyl group may have a substituent.

Specific examples of a substituent include: a halogen atom, an alkoxyl group (for example, a methoxy group, an ethoxy group and an epoxyethyloxy group) and an acyloxy group (for example, an acryloyloxy group, a methacryloyloxy group). It is more preferable for the above alkenyl group to be a catenoid alkenyl group from a cyclic alkenyl group. The above alkenyl group is more preferably a chain alkenyl group than a cyclic alkenyl group and a linear chain alkenyl group is more preferable than a branched chain alkenyl group. The number of carbon atoms in an The number of carbon atoms in an alkyl group is preferably 2-30, more preferably, 2-20, further more preferably 2-10, still more preferably 2-8, and the most preferably 2-6. The alkenyl group may have a substituent.

Specific examples of a substituent include: a halogen atom, an alkoxyl group (for example, a methoxy group, an ethoxy group or an epoxyethyloxy group), or an acyloxy group (for example, an acryloyloxy group and a methacryloyloxy group).

With respect to the above aryl group, preferable are a phenyl group and a naphthyl group, and more preferable is a phenyl group. The aryl group may have a substituent.

Specific examples of substituent include: a halogen atom, a hydroxyl group, a cyano group, a nitro group, a carboxyl group, an alkyl group, an alkenyl group, an aryl group, an alkoxyl group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfonamides group, a carbamoyl group, an alkyl substituted carbamoyl group, an alkenyl substituted carbamoyl group, an aryl substituted carbamoyl group, an amide group, an alkylthio group, an alkenylthio group, an arylthio group and an acyl group. The alkyl group mentioned here is common the alkyl group mentioned above.

The alkyl parts of the alkoxy group, the acyloxy group, the alkoxycarbonyl group, the alkyl substituted sulfamoyl group, the sulfonamides group, the alkyl substituted carbamoyl group, the amide group, the alkylthio group, and the acyl group mentioned here are also common to the alkyl group mentioned above.

The alkenyl group mentioned here is common to the alkenyl group mentioned above.

The alkenyl parts of the alkenyloxy group, the acyloxy group, the alkenyloxycarbonyl group, the alkenyl substituted sulfamoyl group, the sulfonamides group, the alkenyl substituted carbamoyl group, the amide group, the alkenylthio group, and the acyl group mentioned here are also common to the alkenyl group mentioned above.

Specific examples of the above aryl group include: a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The specific examples for the above aryloxy group, the acyloxy group, the aryloxycarbonyl group, the aryl substituted sulfamoyl group, the sulfonamides group, the aryl substituted carbamoyl group, the amide group, the arylthio group, and the acyl group are common to those of the above aryl group.

When $X_1$, $X_2$ and $X_3$ each is —NR—, —O—, or —S—, the heterocyclic group is preferably has aromaticity.

The heterocycle in a heterocyclic group having aromaticity is generally an unsaturated heterocycle and preferably has the largest number of unsaturated bonds. The heterocycle is preferably a 5 membered ring, a 6 membered ring or a 7 membered ring, more preferably a 5 membered ring or a 6 membered ring, and most preferably a 6 membered ring.

The hetero atom contained in the heterocyclic ring is preferably an N atom, an S atom or an O atom and specifically preferably an N atom.

As a heterocyclic ring having aromaticity, a pyridine ring (as a heterocyclic group, for example, a 2-pyridyl group or a 4-pyridyl group is listed) is specifically preferable. The heterocyclic group may have the substituent. Examples of the substituent of the heterocyclic group are common to those of the above aryl part.

When $X_1$, $X_2$, and $X_3$ each is a single bond, the heterocyclic group preferably has a free radical on the nitrogen atom. The heterocyclic group having a free radical on the nitrogen atom is preferably a 5 membered ring, a 6 membered ring or a 7 membered ring, more preferably a 5 membered ring or a 6 membered ring, and most preferably a 5 membered ring. The heterocyclic group may have a plurality of nitrogen atoms.

The heterocyclic group may have a heteroatom other than nitrogen (for example, an O atom or an S atom. The heterocyclic group may have a substituent. Examples of the substituent of the heterocyclic group are common to those of the above aryl part.

Examples of a heterocyclic group having a free radical on a nitrogen atom are shown below:

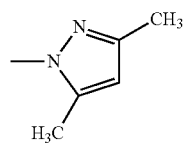

(Hc-1)

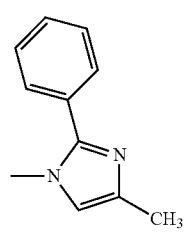

(Hc-2)

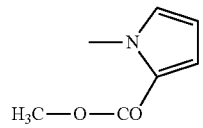

(Hc-3)

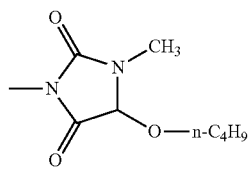

(Hc-4)

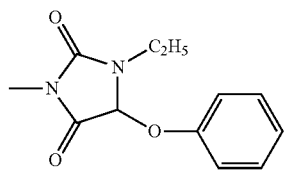

(Hc-5)

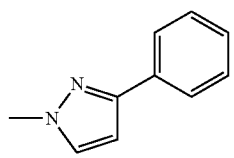

(Hc-6)

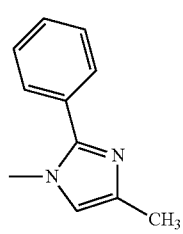

(Hc-7)

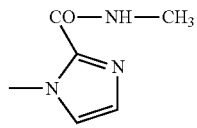

(Hc-8)

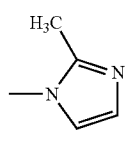

(Hc-9)

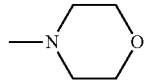

(Hc-10)

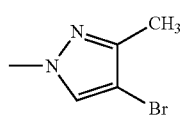

(Hc-11)

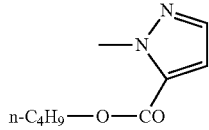

(Hc-12)

The molecular weight of a compound having a 1,3,5-triazine ring is preferably 300-2000. The boiling point of this compound is preferably 260° C. or more. A boiling point can be measured using a commercial measuring assembly (for example, TG/DTA100 produced by Seiko Instruments Inc.).

Example of a compound having a 1,3,5-triazine ring is shown below:

A plurality of R shown below represent the same group.
(1)-(12)

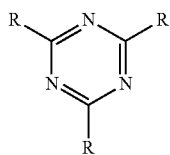

wherein R represents one of the following groups:
(1) Butyl
(2) 2-methoxy-2-ethoxyethyl
(3) 5-Undecenyl
(4) Phenyl
(5) 4-ethoxycarbonylphenyl
(6) 4-butoxyphenyl
(7) p-biphenylyl
(8) 4-pyridyl
(9) 2-naphthyl
(10) 2-methylphenyl
(11) 3,4-dimethoxyphenyl
(12) 2-furil (13)

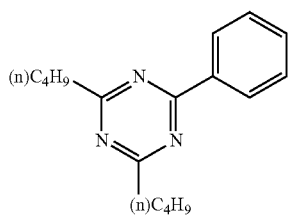

wherein R represents one of the following groups:
(14)-(79)

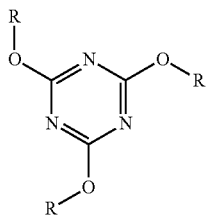

wherein R represents one of the following groups:
(14) Phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenol
(22) 3-benzoyloxyphenyl
(23) 3-phenoxycarbonylphenyl
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenol
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxcarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxy henyl
(68) 3,4,5-triphenylphenyl
(69) 3,4,5-triphenylthiophenyl
(70) 3,45-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,57-triphenoxyphenyl
(79) 3,4,5-trihydroxyphenyl
(80)-(145)

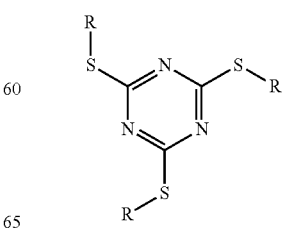

wherein R represents one of the following groups:
(80) Phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4 Hydroxyphenyl
(117) 3,4-diethoxcarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl
(146)-(164)

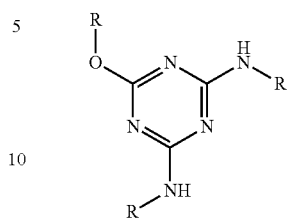

wherein R represents one of the following groups:
(146) Phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl
(165)-(183)

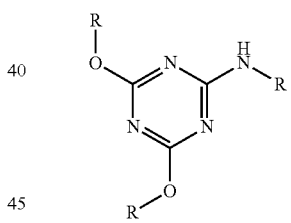

(165) Phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl
(184)-(202)

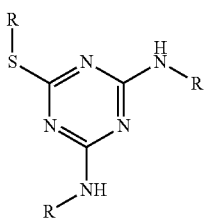

wherein R represents one of the following groups:
(184) Phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-bentoyloxyphenyl
(193) 4-phenoxycarbonylphenyl
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4 Hydroxyphenyl
(203)-(221)

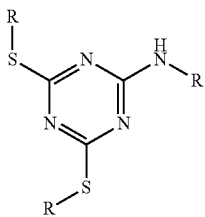

wherein R represents one of the following groups:
(203) Phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenyl
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl
(222)-(419)

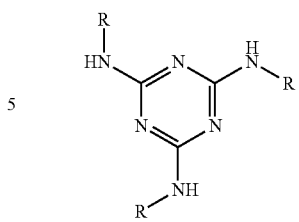

wherein R represents one of the following groups:
(222) Phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4 Hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3 Hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl (277) 2-phenoxycarbonylphenyl
(278) 2-methoxyphenyl
(279) 2-anilinophenyl
(280) 2-isobutyrylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonyl phenyl
(290) 3,4-didodecyloxyphenyl
(291) 3,4-dimethylphenyl
(292) 3,4-dichloro phenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibentoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxy phenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydroxyphenyl.
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl
(382) 2,4,6-triphenoxyphenyl
(383) 2,4,6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenyl sulfamoyl-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl (411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl
(420)
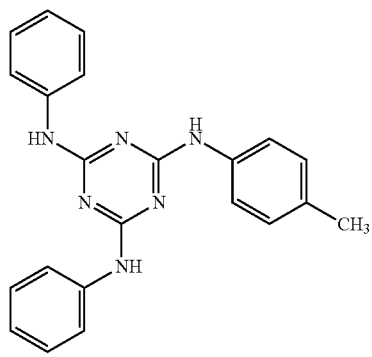
(420')
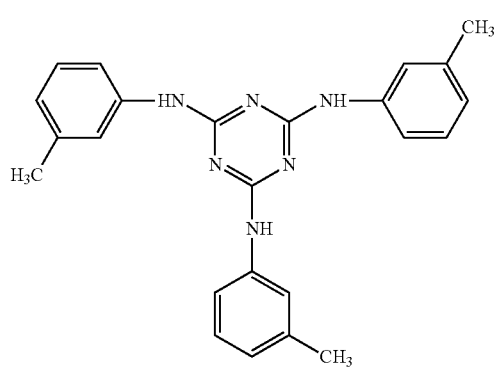
(421)
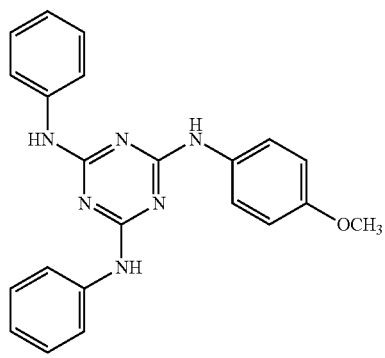
(422)
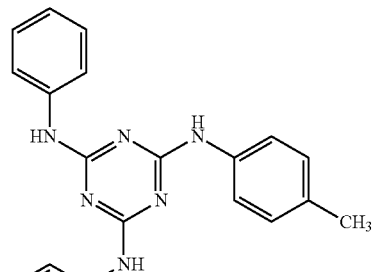
(423)
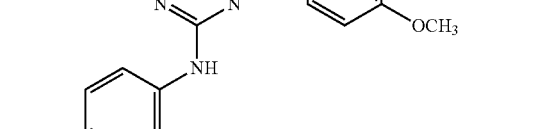
(424)-(426)
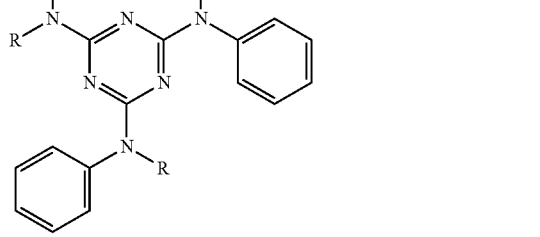
wherein R represents one of the following groups:
(424) methyl
(425) phenyl
(426) butyl
(427)
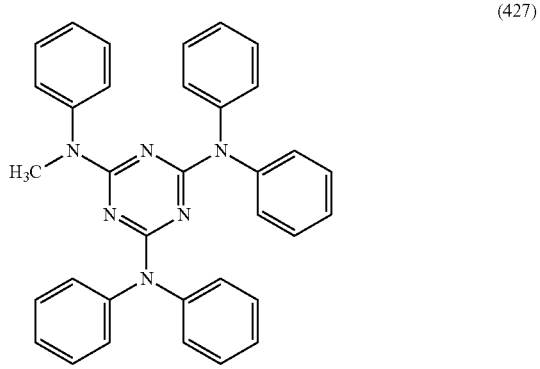

(428)
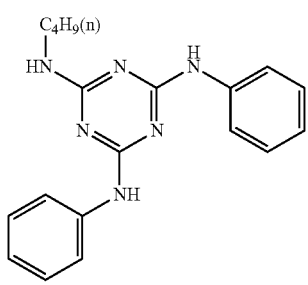
(429)
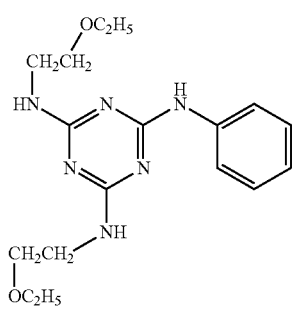
(430)-(437)
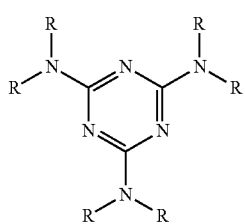
wherein R represents one of the following groups:
(430) methyl
(431) ethyl
(432) butyl
(433) octyl
(434) dodecyl
(435) 2-butoxy-2-ethoxyethyl
(436) benzyl
(437) 4-methoxybenzyl
(438)
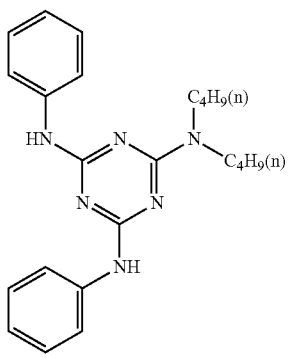
(439)
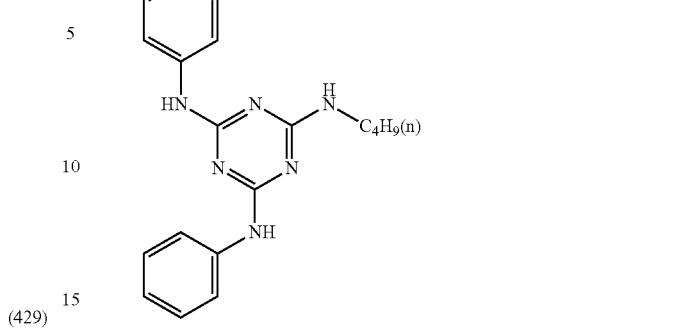
(440)
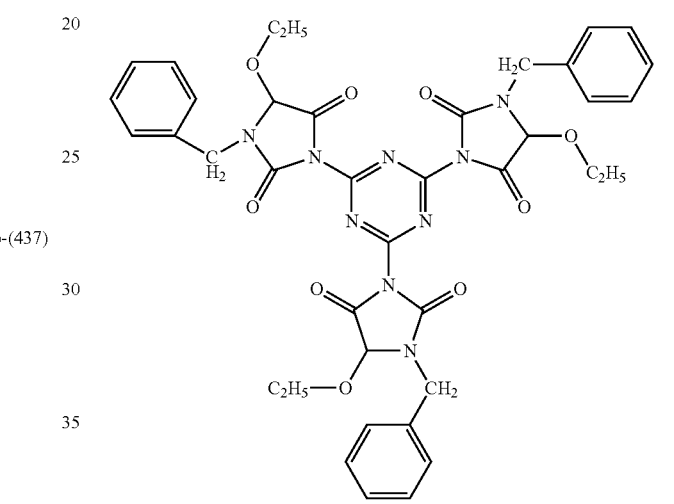
(441)
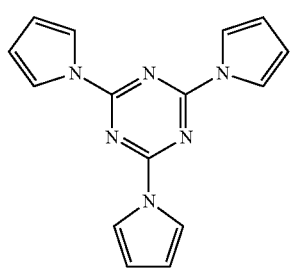
(442)
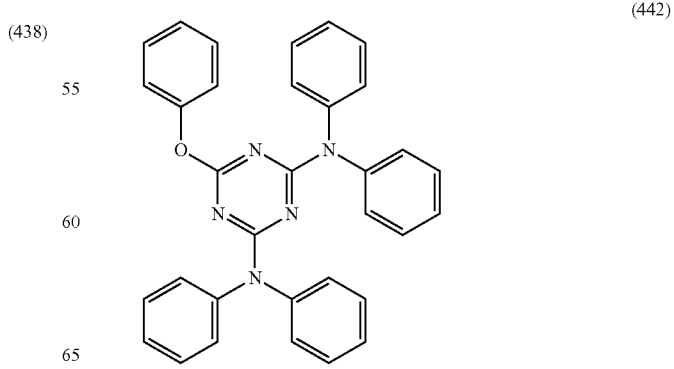

(443)

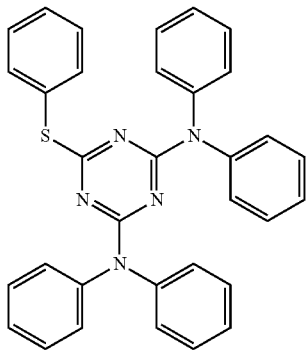

(444)

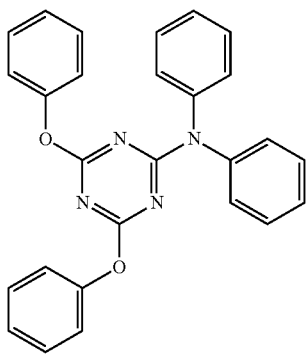

(445)

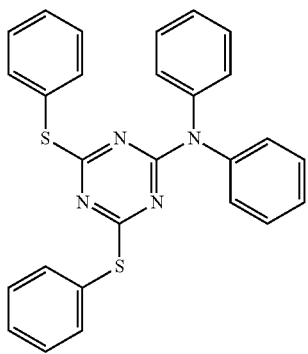

In the present invention, a melamine polymer may be used as a compound having 1,3,5-triazine ring. A melamine polymer is preferably prepared through a polymerization reaction of a melamine compound represented by Formula (D) and a carbonyl compound.

Formula (D)

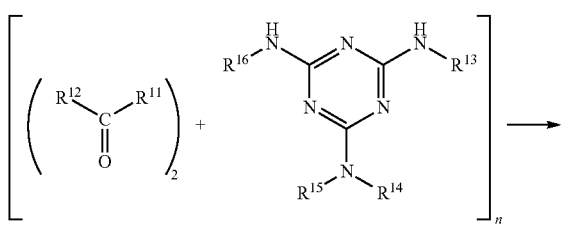

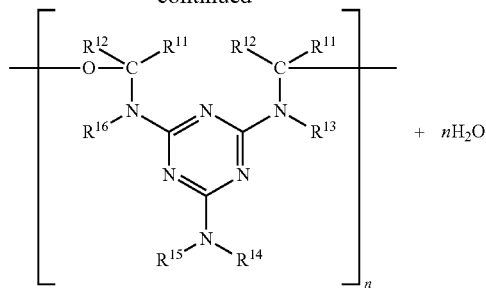

In the above reaction scheme, $R^{11}$, $R^{12}$, $R^{13}$, $R^{14}$, $R^{15}$, and $R^{16}$ each represents a hydrogen atom, an alkyl group, an alkenyl group, an aryl group, or a heterocyclic group.

The above alkyl group, an alkenyl group, an aryl group, heterocyclic groups, and these substituents are common to those aforementioned in relation to Formula (C).

The polymerization reaction of a melamine compound and carbonyl compounds is carried out in same manner as a usual synthetic method of a melamine resin (for example, a melamine formaldehyde resin). A commercially available melamine polymer (melamine resin) may also be used.

The molecular weight of a melamine polymer is preferably 2000 to 40.0000. Examples of a repeat unit of a melamine polymer will be shown below:

(MP-1)-(MP-50)

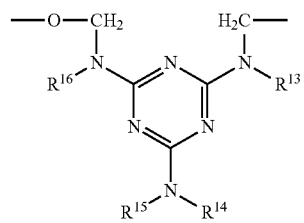

MP-1: $R^{13}$, $R^{14}$, $R^{15}$, $R^{16}$: $CH_2OH$
MP-2: $R^{13}$, $R^{14}$, $R^{15}$, $R^{16}$: $CH_2OCH_3$
MP-3: $R^{13}$, $R^{14}$, $R^{15}$, $R^{16}$: $CH_2O$-i-$C_4H_9$
MP-4: $R^{13}$, $R^{14}$, $R^{15}$, $R^{16}$: $CH_2O$-n-$C_4H_9$
MP-5: $R^{13}$, $R^{14}$, $R^{15}$, $R^{16}$: $CH_2NHCOCH=CH_2$
MP-6: $R^{13}$, $R^{14}$, $R^{15}$, $R^{16}$: $CH_2NHCO(CH_2)_7CH=CH(CH_2)_7CH_3$
MP-7: $R^{13}$, $R^{14}$, $R^{15}$: $CH_2OH$; $R^{16}$: $CH_2OCH_3$
MP-8: $R^{13}$, $R^{14}$, $R^{16}$: $CH_2OH$; $R^{15}$: $CH_2OCH_3$
MP-9: $R^{13}$, $R^{14}$: $CH_2OH$; $R^{15}$, $R^{16}$: $CH_2OCH_3$
MP-10: $R^{13}$, $R^{16}$: $CH_2OH$; $R^{14}$, $R^{15}$: $CH_2OCH_3$
MP-11: $R^{13}$: $CH_2OH$; $R^{14}$, $R^{15}$, $R^{16}$: $CH_2OCH_3$
MP-12: $R^{13}$, $R^{14}$, $R^{16}$: $CH_2OCH_3$; $R^{15}$: $CH_2OH$
MP-13: $R^{13}$, $R^{16}$: $CH_2OCH_3$; $R^{14}$, $R^{15}$: $CH_2OH$
MP-14: $R^{13}$, $R^{14}$, $R^{15}$: $CH_2OH$; $R^{16}$: $CH_2O$-i-$C_4H_9$
MP-15: $R^{13}$, $R^{14}$, $R^{16}$: $CH_2OH$; $R^{15}$: $CH_2O$-i-$C_4H_9$
MP-16: $R^{13}$, $R^{14}$: $CH_2OH$; $R^{15}$, $R^{16}$: $CH_2O$-i-$C_4H_9$
MP-17: $R^{13}$, $R^{16}$: $CH_2OH$; $R^{14}$, $R^{15}$: $CH_2O$-i-$C_4H_9$
MP-18: $R^{13}$: $CH_2OH$; $R^{14}$, $R^{15}$, $R^{16}$: $CH_2O$-i-$C_4H_9$
MP-19: $R^{13}$, $R^{14}$, $R^{16}$: $CH_2O$-i-$C_4H_9$; $R^{15}$: $CH_2OH$
MP-20: $R^{13}$, $R^{16}$: $CH_2O$-i-$C_4H_9$; $R^{14}$, $R^{15}$: $CH_2OH$
MP-21: $R^{13}$, $R^{14}$, $R^{15}$: $CH_2OH$; $R^{16}$: $CH_2O$-n-$C_4H_9$
MP-22: $R^{13}$, $R^{14}$, $R^{16}$: $CH_2OH$; $R^{15}$: $CH_2O$-n-$C_4H_9$

MP-23: $R^{13}$, $R^{14}$: $CH_2OH$; $R^{15}$, $R^{16}$: $CH_2O$-n-$C_4H_9$
MP-24: $R^{13}$, $R^{16}$: $CH_2OH$; $R^{14}$, $R^{15}$: $CH_2O$-n-$C_4H_9$
MP-25: $R^{13}$: $CH_2OH$; $R^{14}$, $R^{15}$, $R^{16}$: $CH_2O$-n-$C_4H_9$
MP-26: $R^{13}$, $R^{14}$, $R^{16}$: $CH_2O$-n-$C_4H_9$; $R^{15}$: $CH_2OH$
MP-27: $R^{13}$, $R^{16}$: $CH_2O$-n-$C_4H_9$; $R^{14}$, $R^{15}$: $CH_2OH$
MP-28: $R^{13}$, $R^{14}$: $CH_2OH$; $R^{15}$: $CH_2OCH_3$; $R^{16}$: $CH_2O$-n-$C_4H_9$
MP-29: $R^{13}$, $R^{14}$: $CH_2OH$; $R^{15}$: $CH_2O$-n-$C_4H_9$; $R^{16}$: $CH_2OCH_3$
MP-30: $R^{13}$, $R^{16}$: $CH_2OH$; $R^{14}$: $CH_2OCH_3$; $R^{15}$: $CH_2O$-n-$C_4H_9$
MP-31: $R^{13}$: $CH_2OH$; $R^{14}$, $R^{15}$: $CH_2OCH_3$; $R^{16}$: $CH_2O$-n-$C_4H_9$
MP-32: $R^{13}$: $CH_2OH$; $R^{14}$, $R^{16}$: $CH_2OCH_3$; $R^{15}$: $CH_2O$-n-$C_4H_9$
MP-33: $R^{13}$: $CH_2OH$; $R^{14}$: $CH_2OCH_3$; $R^{15}$, $R^{16}$: $CH_2O$-n-$C_4H_9$
MP-34: $R^{13}$: $CH_2OH$; $R^{14}$, $R^{15}$: $CH_2O$-n-$C_4H_9$; $R^{16}$: $CH_2OCH_3$
MP-35: $R^{13}$, $R^{14}$: $CH_2OCH_3$; $R^{15}$: $CH_2OH$; $R^{16}$: $CH_2O$-n-$C_4H_9$
MP-36: $R^{13}$, $R^{16}$: $CH_2OCH_3$; $R^{14}$: $CH_2OH$; $R^{15}$: $CH_2O$-n-$C_4H_9$
MP-37: $R^{13}$: $CH_2OCH_3$; $R^{14}$, $R^{15}$: $CH_2OH$; $R^{16}$: $CH_2O$-n-$C_4H_9$
MP-38: $R^{13}$, $R^{16}$: $CH_2O$-n-$C_4H_9$; $R^{14}$: $CH_2OCH_3$; $R^{15}$: $CH_2OH$
MP-39: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$
MP-41: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-42: $R^{13}$: $CH_2OCH_3$; $R^4$: $CH_2OH$; $R^{15}$: $CH_2O$-n-$C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-44: $R^{13}$: $CH_2O$-n-$C_4H_9$; $R^{14}$: $CH_2OCH_3$; $R^1CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$
MP-47: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-50: $R^{13}$: $CH_2NHCO(CH_2)_7CH=CH(CH_2)_7CH_3$; $R^{14}$: $CH_2OCH_3$; $R^{15}CH_2OH$; $R^{16}$: $CH_2NHCOCH=CH_2$ (MP-51)-(MP-100)

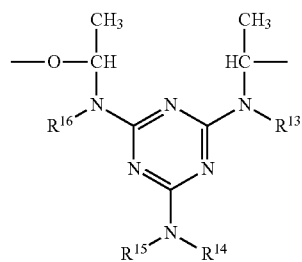

MP 51: $R^{13}$, $R^{14}$, $R^{15}$, $R^{16}$: $CH_2OH$
MP-52: $R^{13}$, $R^{14}$, $R^{15}$, $R^{16}$: $CH_2OCH_3$
MP-53: $R^{13}$, $R^{14}$, $R^{15}$, $R^{16}$: $CH_2O$-i-$C_4H_9$
MP-54: $R^{13}$, $R^{14}$, $R^{15}$, $R^{16}$: $CH_2O$-n-$C_4H_9$
MP-55: $R^{13}$, $R^{14}$, $R^{15}$, $R^{16}$: $CH_2NHCOCH=CH_2$
MP-56: $R^{13}$, $R^{14}$, $R^{15}$, $R^{16}$: $CH_2NHCO(CH_2)_7CH=CH(CH_2)_7CH_3$
MP-57: $R^{13}$, $R^{14}$, $R^{15}$, $R^{16}$: $CH_2OH$; $R^{16}$: $CH_2OCH_3$
MP-58: $R^{13}$, $R^{14}$, $R^{15}$, $R^{16}$: $CH_2OH$; $R^{15}$: $CH_2OCH_3$
MP-59: $R^{13}$, $R^{14}$: $CH_2OH$; $R^{15}$, $R^{16}$: $CH_2OCH_3$
MP-60: $R^{13}$, $R^{16}$: $CH_2OH$; $R^{14}$, $R^{15}$: $CH_2OCH_3$
MP-61: $R^{13}$: $CH_2OH$; $R^{14}$, $R^{15}$, $R^{16}$: $CH_2OCH_3$
MP-62: $R^{13}$, $R^{14}$, $R^{16}$: $CH_2OCH_3$; $R^{15}$: $CH_2OH$
MP-63: $R^{13}$, $R^{16}$: $CH_2OCH_3$; $R^{14}$, $R^{15}$: $CH_2OH$.
MP-64: $R^{13}$, $R^{14}$, $R^{15}$: $CH_2OH$; $R^{16}$: $CH_2O$-i-$C_4H_9$
MP-65: $R^{13}$, $R^{14}$, $R^{16}$: $CH_2OH$; $R^{15}$: $CH_2O$-i-$C_4H_9$
MP-66: $R^{13}$, $R^{14}$: $CH_2OH$; $R^{15}$, $R^{16}$: $CH_2O$-i-$C_4H_9$
MP-67: $R^{13}$, $R^{16}$: $CH_2OH$; $R^{14}$, $R^{15}$: $CH_2O$-i-$C_4H_9$
MP-68: $R^{13}$: $CH_2OH$; $R^{14}$, $R^{15}$, $R^{16}$: $CH_2O$-i-$C_4H_9$
MP-69: $R^{13}$, $R^{14}$, $R^{16}$: $CH_2O$-i-$C_4H_9$; $R^{15}$: $CH_2OH$
MP-70: $R^{13}$, $R^{16}$: $CH_2O$-i-$C_4H_9$; $R^{14}$, $R^{15}$: $CH_2OH$
MP-71: $R^{13}$, $R^{14}$, $R^{15}$: $CH_2OH$; $R^{16}$: $CH_2O$-n-$C_4H_9$
MP-72: $R^{13}$, $R^{14}$, $R^{16}$: $CH_2OH$; $R^{15}$: $CH_2O$-n-$C_4H_9$
MP-73: $R^{13}$, $R^{14}$: $CH_2OH$; $R^{15}$, $R^{16}$: $CH_2O$-n-$C_4H_9$
MP-74: $R^{13}$, $R^{16}$: $CH_2OH$; $R^{14}$, $R^{15}$: $CH_2O$-n-$C_4H_9$
MP-75: $R^{13}$: $CH_2OH$; $R^{14}$, $R^{15}$, $R^{16}$: $CH_2O$-n-$C_4H_9$
MP-76: $R^{13}$, $R^{14}$, $R^{16}CH_2O$-n-$C_4H_9$; $R^{15}CH_2OH$
MP-77: $R^{13}$, $R^{16}$: $CH_2O$-n-$C_4H_9$; $R^{14}$, $R^{15}$: $CH_2OH$
MP-78: $R^{13}$, $R^{14}$: $CH_2OH$; $R^{15}$: $CH_2OCH_3$; $R^{16}$: $CH_2O$-n-$C_4H_9$
MP-79: $R^{13}$, $R^{14}$: $CH_2OH$; $R^{15}CH_2O$-n-$C_4H_9$; $R^{16}$: $CH_2OCH_3$
MP-80: $R^{13}$, $R^{16}$: $CH_2OH$; $R^{14}$: $CH_2OCH_3$; $R^{15}$: $CH_2O$-n-$C_4H_9$
MP-81: $R^{13}$, $R^{14}$: $CH_2OH$; $R^{15}$: $CH_2OCH_3$; $R^{16}$: $CH_2O$-n-$C_4H_9$
MP-82: $R^{13}$, $R^{14}$, $R^{16}$: $CH_2OCH_3$; $R^{15}$: $CH_2O$-n-$C_4H_9$
MP-83: $R^{13}$: $CH_2OH$; $R^{14}$: $CH_2OCH_3$; $R^{15}$, $R^{16}$: $CH_2O$-n-$C_4H_9$
MP 84: $R^{13}$: $CH_2OH$; $R^{14}$, $R^{15}$: $CH_2O$-n-$C_4H_9$; $R^{16}$: $CH_2OCH_3$
MP-85: $R^{13}$, $R^{14}$: $CH_2OCH_3$; $R^{15}$: $CH_2OH$; $R^{16}$: $CH_2O$-n-$C_4H_9$
MP-86: $R^{13}$, $R^{16}$: $CH_2OCH_3$; $R^{14}$: $CH_2OH$; $R^{15}$: $CH_2O$-n-$C_4H_9$
MP-87: $R^{13}$: $CH_2OCH_3$; $R^{14}$, $R^{15}$: $CH_2OH$; $R^{16}$: $CH_2O$-n-$C_4H_9$
MP-88: $R^{13}$, $R^{16}$: $CH_2O$-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-90: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$

MP-91: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$

MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$

MP-93: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$

MP-94: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$

MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$

MP-96: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$

MP-97: $R^{13}$: $CH_2OH$; $R^{14}$: $CH_2NHCO(CH_2)_7CH=CH(CH_2)_7OH_3$; $R^{15}$: $CH_2NHCOCH=CH_2$; $R^{16}$: $CH_2OCH_3$

MP-98: $R^{13}$: $CH_2OCH_3$; $R^{14}$ $CH_2OH$; $R^{15}$ $CH_2NHCO(CH_2)_7CH=CH(CH_2)_7CH_3$; $R^{16}$: $CH_2NHCOCH=CH_2$

MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$

MP-100: $R^{13}$: $CH_2NHCO(CH_2)_7CH=CH(CH_2)_7CH_3$; $R^{14}$: $CH_2OCH_3$;

(MP-101)-(MP-150)

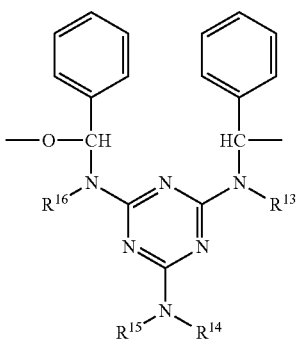

MP-101: $R^{13}$, $R^{14}$, $R^{15}$, $R^{16}$: $CH_2OH$
MP-102: $R^{13}$, $R^{14}$, $R^{15}$, $R^{15}$: $CH_2OCH_3$
MP-103: $R^{13}$, $R^{14}$, $R^{15}$, $R^{16}$: $CH_2O$-i-$C_4H_9$
MP-104: $R^{13}$, $R^{14}$, $R^{15}$, $R^{16}$: $CH_2O$-n-$C_4H_9$
MP-105: $R^{13}$, $R^{14}$, $R^{15}$, $R^{16}$: $CH_2NHCOCH=CH_2$
MP-106: $R^{13}$, $R^{14}$, $R^{15}$, $R^{16}$: $CH_2NHCO(CH_2)_7CH=CH(CH_2)_7CH_3$
MP-107: $R^{13}$, $R^{15}$: $CH_2OH$; $R^{16}$: $CH_2OCH_3$
MP-108: $R^{13}$, $R^{14}$, $R^{16}$: $CH_2OH$; $R^{15}$: $CH_2OCH_3$
MP-109: $R^{13}$, $R^{14}$: $CH_2OH$; $R^{15}$, $R^{16}$: $CH_2OCH_3$
MP-110: $R^{13}$, $R^{16}$: $CH_2OH$; $R^{14}$, $R^{15}$: $CH_2OCH_3$
MP-111: $R^{13}$: $CH_2OH$; $R^{14}$, $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $CH_2OH$; $R^{16}$: $CH_2O$-i-$C_4H_9$
MP-115: $R^{13}$, $R^{14}$, $R^{16}$: $CH_2OH$; $R^{16}$: $CH_2O$-i-$C_4H_9$
MP-116: $R^{13}$, $R^{14}$: $CH_2OH$; $R^{15}$, $R^{16}$: $CH_2O$-i-$C_4H_9$
NP-117: $R^{13}$, $R^{16}$: $CH_2OH$; $R^{14}$, $R^{15}$: $CH_2O$-i-$C_4H_9$
MP-118: $R^{13}$: $CH_2OH$; $R^{14}$, $R^{15}$, $R^{16}$: $CH_2O$-i-$C_4H_9$
MP-119: $R^{13}$, $R^{14}$, $R^{16}$: $CH_2O$-i-$C_4H_9$; $R^{15}$: $CH_2OH$
MP-120: $R^{13}$, $R^{16}$: $CH_2O$-i-$C_4H_9$; $R^{14}$, $R^{15}$: $CH_2OH$
MP-121: $R^{13}$, $R^{14}$, $R^{15}$: $CH_2OH$; $R^{16}$: $CH_2O$-n-$C_4H_9$
MP-122: $R^{13}$, $R^{14}$: $CH_2OH$; $R^{15}$, $R^{16}$: $CH_2O$-n-$C_4H_9$
MP-123: $R^{13}$, $R^{14}$: $CH_2OH$; $R^{15}$, $R^{16}$: $CH_2O$-n-$C_4H_9$
MP-124: $R^{13}$, $R^{16}$: $CH_2OH$; $R^{14}$, $R^{15}$: $CH_2O$-n-$C_4H_9$
MP-125: $R^{13}$: $CH_2OH$; $R^{14}$, $R^{15}$, $R^{16}$: $CH_2O$-n-$C_4H_9$
MP-126: $R^{13}$, $R^{14}$, $R^{16}$: $CH_2O$-n-$C_4H_9$; $R^{15}$: $CH_2OH$
MP-127: $R^{13}$, $R^{16}$: $CH_2O$-n-$C_4H_9$; $R^{14}$, $R^{15}$: $CH_2OH$
MP-128: $R^{13}$, $R^{14}$: $CH_2OH$; $R^{15}$: $CH_2OCH_3$; $R^{16}$: $CH_2O$-n-$C_4H_9$
MP-129: $R^{13}$, $R^{14}$: $CH_2OH$; $R^{15}$: $CH_2O$-n-$C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2O$-n-$C_4H_9$
MP-131: $R^{13}$: $CH_2OH$; $R^{14}$, $R^{15}$: $CH_2OCH_3$; $R^{16}$: $CH_2O$-n-$C_4H_9$
MP-132: $R^{13}$: $CH_2OH$; $R^{14}$, $R^{16}$: $CH_2OCH_3$; $R^{15}$: $CH_2O$-n-$C_4H_9$
MP-133: $R^{13}$: $CH_2OH$; $R^{14}$: $CH_2OCH_3$; $R^{15}$ $CH_2O$-n-$C_4H_9$
MP-134: $R^{13}$: $CH_2OH$; $R^{14}$, $R^{15}$: $CH_2O$-n-$C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2O$-n-$C_4H_9$
MP-136: $R^{13}$, $R^{16}$: $CH_2OCH_3$; $R^{14}$: $CH_2OH$; $R^{15}$: $CH_2O$-n-$C_4H_9$
MP-137: $R^{13}$: $CH_2OCH_3$; $R^{14}$, $R^{15}$: $CH_2OH$; $R^{16}$: $CH_2O$-n-$C_4H_9$
MP-138: $R^{13}$, $R^{16}$: $CH_2O$-n-$C_4H_9$; $R^{14}$: $CH_2OCH_3$; $R^{15}$: $CH_2OH$
MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH\:OH$; $R^{14}$: $CH_2OCH_3$; $R^{15}$: $CH_2NHCOCH=CH_2$; $R^{16}$: $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$: $CH_2OH$; $R^{14}$: $CH_2OCH_3$; $R^{15}$: $CH_2NHCO(CH_2)_7CH=CH(CH_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$
MP-147: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$
MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-151)-(MP-200)

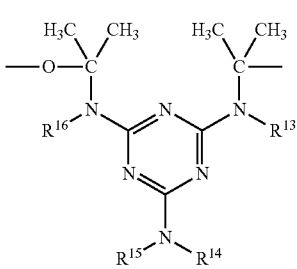

MP-151: $R^{13}$, $R^{14}$, $R^{15}$, $R^{16}$CH$_2$OH
MP-152: $R^{13}$, $R^{14}$, $R^{15}$, $R^{16}$: CH$_2$OCH$_3$
MP-153: $R^{13}$, $R^{14}$, $R^{15}$, $R^{16}$: CH$_2$O-i-C$_4$H$_9$
MP-154: $R^{13}$, $R^{14}$, $R^{15}$, $R^{16}$: CH$_2$O-n-C$_4$H$_9$
MP-155: $R^{13}$, $R^{14}$, $R^{15}$, $R^{16}$: CH$_2$NHCOCH=CH$_2$
MP-156: $R^{13}$, $R^{14}$, $R^{15}$, $R^{16}$: CH$_2$NHCO(CH$_2$)$_7$CH=CH(CH$_2$)$_7$CH$_3$
MP-157: $R^{13}$, $R^{14}$, $R^{15}$: CH$_2$OH; $R^{16}$: CH$_2$OCH$_3$
MP-158: $R^{13}$, $R^{14}$, $R^{16}$: CH$_2$OH; $R^{15}$: CH$_2$OCH$_3$
MP-159: $R^{13}$, $R^{14}$: CH$_2$OH; $R^{15}$, $R^{16}$: CH$_2$OCH$_3$
MP-160: $R^{13}$, $R^{16}$: CH$_2$OH; $R^{14}$, $R^{15}$: CH$_2$OCH$_3$
MP-161: $R^{13}$: CH$_2$OH; $R^{14}$, $R^{15}$, $R^{16}$: CH$_2$OCH$_3$
MP-162: $R^{13}$, $R^{14}$, $R^{16}$: CH$_2$OCH$_3$; $R^{15}$: CH$_2$OH
MP-163: $R^{13}$, $R^{16}$: CH$_2$OCH$_3$; $R^{14}$, $R^{15}$: CH$_2$OH
MP-164: $R^{13}$, $R^{14}$, $R^{15}$: CH$_2$OH; $R^{16}$: CH$_2$O-i-C$_4$H$_9$
MP-165: $R^{13}$, $R^{14}$, $R^{16}$: CH$_2$OH; $R^{15}$: CH$_2$O-i-C$_4$H$_9$
MP-168: $R^{13}$, $R^{14}$: CH$_2$OH; $R^{15}$, $R^{16}$: CH$_2$O-i-C$_4$H$_9$
MP-167: $R^{13}$, $R^{16}$: CH$_2$OH; $R^{14}$, $R^{15}$: CH$_2$O-i-C$_4$H$_9$
MP-168: $R^{13}$: CH$_2$OH; $R^{14}$, $R^{15}$, $R^{16}$: CH$_2$O-i-C$_4$H$_9$
MP-169: $R^{13}$, $R^{14}$, $R^{16}$: CH$_2$O-i-C$_4$H$_9$; $R^{15}$: CH$_2$OH
MP-170: $R^{13}$, $R^{16}$: CH$_2$O-i-C$_4$H$_9$; $R^{14}$, $R^{15}$: CH$_2$OH
MP-171: $R^{13}$, $R^{14}$, $R^{15}$: CH$_2$OH; $R^{16}$: CH$_2$O-n-C$_4$H$_9$
MP-172: $R^{13}$, $R^{14}$, $R^{15}$: CH$_2$OH; $R^{15}$: CH$_2$O-n-C$_4$H$_9$
MP-173: $R^{13}$, $R^{14}$: CH$_2$OH; $R^{15}$, $R^{16}$: CH$_2$O-n-C$_4$H$_9$
MP-174: $R^{13}$, $R^{16}$: CH$_2$OH; $R^{14}$, $R^{15}$: CH$_2$O-n-C$_4$H$_9$
MP-175: $R^{13}$CH$_2$OH; $R^{14}$$R^{15}$, $R^{16}$: CH$_2$O-n-C$_4$H$_9$
MP-176: $R^{13}$, $R^{14}$, $R^{15}$: CH$_2$O-n-C$_4$H$_9$; $R^{15}$: CH$_2$OH
MP-177: $R^{13}$, $R^{16}$: CH$_2$O-n-C$_4$H$_9$; $R^{14}$, $R^{15}$: CH$_2$OH
MP-178: $R^{13}$, $R^{14}$: CH$_2$OH; $R^{15}$: CH$_2$OCH$_3$; $R^{16}$: CH$_2$O-n-C$_4$H$_9$
MP-179: $R^{13}$, $R^{14}$: CH$_2$OH; $R^{16}$: CH$_2$O-n-C$_4$H$_9$; $R^{16}$: CH$_2$OCH$_3$
MP-180: $R^{13}$, $R^{16}$: CH$_2$OH; $R^{14}$: CH$_2$OCH$_3$; $R^{15}$: CH$_2$O-n-C$_4$H$_9$
MP-181: $R^{13}$: CH$_2$OH; $R^{14}$, $R^{15}$: CH$_2$OCH$_3$; $R^{16}$: CH$_2$O-n-C$_4$H$_9$
MP-182: $R^{13}$: CH$_2$OH; $R^{14}$, $R^{16}$: CH$_2$OCH$_3$; $R^{15}$: CH$_2$O-n-C$_4$H$_9$
MP-183: $R^{13}$: CH$_2$OH; $R^{14}$: CH$_2$OCH$_3$; $R^{15}$, $R^{16}$: CH$_2$O-n-C$_4$H$_9$
MP-184: $R^{13}$: CH$_2$OH; $R^{14}$, $R^{15}$: CH$_2$O-n-C$_4$H$_9$; $R^{16}$: CH$_2$OCH$_3$
MP-185: $R^{13}$, $R^{14}$: CH$_2$OCH$_3$; $R^{15}$: CH$_2$OH; $R^{16}$: CH$_2$O-n-C$_4$H$_9$
MP-186: $R^{13}$, $R^{16}$: CH$_2$OCH$_3$; $R^{14}$: CH$_2$OH; $R^{15}$: CH$_2$O-n-C$_4$H$_9$
MP-187: $R^{13}$: CH$_2$OCH$_3$; $R^{14}$, $R^{15}$: CH$_2$OH; $R^{16}$: CH$_2$O-n-C$_4$H$_9$
MP-188: $R^{13}$, $R^{16}$: CH$_2$O-n-C$_4$H$_9$; $R^{14}$: CH$_2$OCH$_3$; $R^{15}$: CH$_2$OH
MP-189: $R^{13}$: CH$_2$OH; $R^{14}$: CH$_2$OCH$_3$; $R^{15}$: CH$_2$O-n-C$_4$H$_9$; $R^{16}$: CH$_2$NHCOCH=CH$_2$
MP-190: $R^{13}$: CH$_2$OH; $R^{14}$: CH$_2$OCH$_3$; $R^{15}$: CH$_2$NHCOCH=CH$_2$; $R^{16}$CH$_2$O-n-C$_4$—H$_9$
MP-191: $R^{13}$: CH$_2$OH; $R^{14}$: CH$_2$O-n-C$_4$H$_9$; $R^{15}$CH$_2$NHCOCH=CH$_2$; $R^{16}$: CH$_2$OCH$_3$
MP-192: $R^{13}$: CH$_2$OCH$_3$; $R^{14}$: CH$_2$OH; $R^{15}$: CH$_2$O-n-C$_4$H$_9$; $R^{16}$: CH$_2$NHCOCH=CH$_2$
MP-193: $R^{13}$: CH$_2$OCH$_3$; $R^{14}$: CH$_2$OH; $R^{15}$: CH$_2$NHCOCH=CH$_2$; $R^{16}$: CH$_2$O-n-C$_4$H$_9$
MP-194: $R^{13}$: CH$_2$O-n-C$_4$H$_9$; $R^{14}$: CH$_2$OCH$_3$; $R^{15}$: CH$_2$OH; $R^{16}$: CH$_2$NHCOCH=CH$_2$
MP-195: $R^{13}$: CH$_2$OH; $R^{14}$: CH$_2$OCH$_3$; $R^{15}$: CH$_2$NHCO(CH$_2$)$_7$CH=CH(CH$_2$)$_7$CH$_3$; $R^{16}$: CH$_2$NHCOCH=CH$_2$
MP-196: $R^{13}$: CH$_2$OH; $R^{14}$: CH$_2$OCH$_3$; $R^{15}$: CH$_2$NHCOC=CH$_2$; $R^{16}$: CH$_2$NHCO(CH$_2$)$_7$CH=CH(CH$_2$)$_7$CH$_3$
MP-197: $R^{13}$: CH$_2$OH; $R^{14}$: CH$_2$NHCO(CH$_2$)$_7$CH=CH(CH$_2$)$_7$CH$_3$; $R^{15}$: CH$_2$NHCOCH=CH$_2$; $R^{16}$: CH$_2$OCH$_3$
MP-198: $R^{13}$: CH$_2$OCH$_3$; $R^{14}$: CH$_2$OH; $R^{15}$CH$_2$NHCO(CH$_2$)$_7$CH=CH(CH$_2$)$_7$CH$_3$; $R^{16}$: CH$_2$NHCOCH=CH$_2$
MP-199: $R^{13}$: CH$_2$OCH$_3$; $R^{14}$: CH$_2$OH; $R^{15}$: CH$_2$NHCOCH=CH$_2$; $R^{16}$: CH$_2$NHCO(CH$_2$)$_7$CH=CH(CH$_2$)$_7$CH$_3$
MP-200: $R^{13}$: CH$_2$NHCO(CH$_2$)$_7$CH=CH(CH$_2$)$_7$CH$_3$; $R^{14}$: CH$_2$OCH$_3$; $R^{15}$: CH$_2$OH; $R^{16}$: CH$_2$NHCOCH=CH$_2$

In the present invention, a copolymer containing two or more kinds of above repeat units is also usable. Two or more kinds of homopolymer or a copolymer may also be used in combination.

A compound having two or more kinds of 1,3,5-triazine rings may be used and two or more discotic compounds (for example, a compound having a 1,3,5-triazine ring and a compound having a porphyrin moiety) are also usable.

These additives are preferably used in an amount of 0.2-30% by weight, more preferably 1-20% by weight based on the weight of the cellulose ester film.

A triazine compound represented by Formula (I) of JP-A No. 2001-235621 may be also preferably used for the cellulose ester film of the present invention.

The cellulose ester film of the present invention preferably contains two or more kinds of UV absorbing agents.

As a UV absorbing agent, a polymer UV absorbing agent may also be preferably used, and specifically a UV absorbing agent described in JP-A No. 6-148430 polymer type is preferable.

The addition methods of said UV absorbing agents are as follows. They may be dissolved in organic solvents such as alcohol (e.g., methanol, ethanol or butanol), methylene chloride, methyl acetate, acetone and dioxolane, and the resulting solution of which is added to a dope. Alternatively, they may be added directly to a dope. UV absorbing agents such as inorganic powder, which are not soluble in organic solvents, may be dispersed into a mixture of organic solvents and cellulose ester, employing a dissolver or a sand mill, and then added to a dope.

The employed amount of UV absorbing agents may vary depending on the type of UV absorbing agent or on the use condition, however, when the dried layer thickness of the cellulose ester film is 30-200 the content of a UV absorbing agent is preferably 0.5-4.0% by weight based on the weight of the cellulose ester film, and more preferably 0.6-2.0% by weight.

<Particles>

The cellulose ester film of the present invention preferably contains microparticles.

As for the microparticles use in the present invention, examples of inorganic microparticles include: silicon dioxide microparticles, titanium dioxide microparticles, aluminium oxide microparticles, zirconium oxide microparticles, calcium carbonate microparticles, talc microparticles, clay microparticles, calcinated caolin microparticles, calcinated calcium silicate microparticles, hydration calcium silicate microparticles, aluminium silicate microparticles, magnesium silicate microparticles, and calcium phosphate microparticles. Microparticles containing silicon are preferable, because low turbidity of the film is obtained. Silicon dioxide microparticles are specifically preferable.

The mean diameter of primary particles is preferably from 5 to 50 nm, and more preferably from 7 to 20 nm. The particle should preferably exist as an aggregated secondary particle of a diameter from 0.05 to 0.3 μm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticles of silicon dioxide available on the market include, for example: AEROSIL R972, R927V, R974, R812, 200, 200V, 300, R202, OX50 and TT600 which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 120, 145, 3120 and 240, which are manufactured by Toshiba Silicone Co., Ltd.

Among the microparticles listed above, AEROSIL 200V and AEROSIL R972V are specifically preferable with respect to exhibiting a lower friction coefficient while the low turbidity is maintained. Kinetic friction coefficient of the rear side of an actinic ray curable resin layer of the present invention is preferably not more than 1.0.

<Antioxidant>

In the present invention, the following antioxidants are preferably used.

As the antioxidant, a phenol-containing antioxidant, a phosphoric acid-containing antioxidant, a sulfur-containing antioxidant, a stabilizer against heat processing and an oxygen scavenger are employable, and among them the phenol-containing antioxidant, and particularly an alkyl-substituted phenol-containing antioxidant are preferable. By using an antioxidant as described above in the retardation film, the coloring and the lowering in the strength of the retardation film which may occur in the film production process by heating by being oxidized can be prevented without loosing the transparency and the heat resistance of the retardation film. These antioxidants may be employed alone or in combination of two or more kinds thereof. The adding amount is optionally decided within the range in which the effect of the invention is maintained, and is preferably from 0.001 to 5 weight parts, and more preferably from 0.01 to 1 weight part, in 100 weight parts of the polymer of the present invention.

As the antioxidant, a hindered phenol antioxidant is preferred, which includes 2,6-dialkylphenol derivatives disclosed in U.S. Pat. No. 4,839,405, columns 12-14. Such the compounds include ones represented by Formula (I).

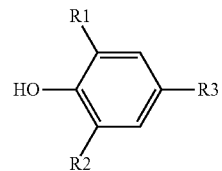

Formula (1)

In the above formula, R1, R2 and R3 each represent a further substituted or unsubstituted alkyl group. Specific examples of the hindered, phenol compound include: n-octadecyl 3-(3,5-di-t-butyl-4-hydroxyphenyl)propionate, n-octadecyl 3-(3,5-di t-butyl-4-hydroxyphenyl)acetate, n-octadecyl 3,5-di t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neododecyl 3-(3,5-di-t-butyl-4-hydroxyphenyl)propionate, dodecylβ(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-t-butyl-4-hydroxyphenyl)propionate, 2-(n-octylthio)ethyl 3,5-di-t-butyl-e-hydroxybenzoate, 2-(n-octylthio)ethyl 3,5-di-t-butyl-4-hydroxyphenylacetate, 2-(n-octadecylthio)ethyl 3,5-di-t-butyl-4-hydroxybenzoate, 2-(2-hydroxyethylthio)ethyl 3,5-di-t-butyl-4-hydroxybenzoate, diethylglycol bis-(3,5-di-t-butyl-4-hydroxyphenyl)propionate, 2-(n-octadecylthio) ethyl 3-(3,5-di-t-butyl-4-hydroxyphenyl)propionate, stearylamido N,N-bis[ethylene 3-(3,5-di-t-butyl-4-hydroxyphenyl)-propionate], n-butylimino N,N-bis-[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-stearoylo-xyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)-propionate], neopentyl glycol bis-[3-(3,5-di-t-butyl-4-hydroxyphenyl)propionate], ethylene glycol bis-(3,5-di-t-butyl-4-hydroxyphenylacetate), glycerol 1-n-octadecanoate-2,3-bis-(3,5-di-t-butyl-4-hydroxyphenylacetate), pentaerythrytol tetrakis[3-(3,5-di-t-butyl-4'-hydroxyphenyl)propionate], 1,1,1-trimethylolethane tris[3-(3,5-di-t-butyl-hydroxyphenyl)propionate], sorbitol hexa-[3-(3,5-di-t-butyl-hydroxyphenyl)propionate], 2-hydroxyethyl 7-(3,5-di-t-butyl-hydroxyphenyl)propionate, 2-stearoyloxyethyl 7-(3,5-di-t-butyl-hydroxyphenyl)-heptanoate, 1,6-n-hexanediol bis-[(3,5-di-t-butyl-4-hydroxyphenyl)propionate] and pentaerythrytol tetrakis(3,5-di-t-butyl-4-hydroxycinnamate). The above described type hindered phenol antioxidant is, for example, available on the market under the commercial name of Irganox 1076 and Irganox 1010 of Ciba. Specialty Chemicals.

Concrete examples of other antioxidant include a phosphor type antioxidant such as trisnonylphenyl phosphite and tris (2,4-di-tert-butylphenyl) phosphite, a sulfur type antioxidant such as dilauryl 3,3'-thiopropionate, dimyristyl 3,3'-thiopropionate, distearyl 3,3'-thiopropionate and pentaerythrytyl tetrakis(3-laurylthiopropionate), an antiheating stabilizer such as 2-tert-butyl-6-(3-tert-butyl-2-hydroxy-5-methylbenzyl)-4-methylphenyl-acrylate and 2-[1-(2-hydroxy-3,5-di-tert-pentylphenyl-acrylate, a 3,4-dihydro-2H-1-benzopurane type compound described in JP-A No. 8-27508, a 3,3'-spyrodichroman type compound, a 1,1-spyroindan type compound, morpholine, thiomorpholine, thiomorpholine oxide, thiomorpholine dioxide, a compound having piperazine skeleton as a partial structure thereof, and an oxygen scavenger such as a dialkoxybenzene type compound described in Tokkai Hei 3-174150. A part of each of these antioxidants may be partially or regularly bonded with a polymer in a form of pendant. Moreover, the plasticizer may be included as a partial structure of an additive such as an antioxidant, an acid scavenger and a UV absorbent.

(Acid Scavenger)

As the acid scavenger, ones containing an acid capturing epoxy compound described in U.S. Pat. No. 4,137,201 are preferable. Such the epoxy compounds as the acid scavenger have been known in the field of the art, and examples thereof include glycidyl ether of various polyethylene glycols, particularly a polyglycol driven by condensation of approximately 8 to 40 moles of ethylene glycol per mole of the polyglycol, diglycidyl ether of glycerol, an metal epoxy compound, for example, ones usually used in a vinyl polymer composition, an epoxide ether condensate, diglycidyl ether of bisphenol A namely 4,4'-dihydroxydiphenyldimethylmthane, an epoxide unsaturated fatty acid ester, particularly an ester of alkyl having 2 to 4 carbon atoms of a fatty acid having 2 to 22 carbon atoms such as butyl epoxystearate, and a triglyceride of one of various epoxide long chain fatty acids, for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12 to 22 carbon atoms. An epoxy group-containing epoxide resin compound available on the market EPON815c, manufacture by Miller-Stephenson Chemical Co., Ltd., and an epoxide ether oligomer condensation product represented by Formula (2) are particularly preferable.

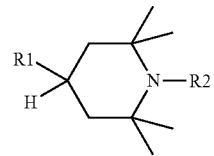

Formula (3)

In the above formula, R1 and R2 are each a hydrogen atom or a substituent. Concrete examples of the hindered amine photo-stabilizer include 4-hydroxy-2,2,6,6-tetramethyl-piperidine, a allyl-4-hydroxy-2,2,6,6-tetramethyl-piperidine, 1-benzyl-4-hydroxy-2,2,6,6-tetramethyl-piperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-saliciloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylamleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethylpiperidine-4-yl)-phthalate, 1-acetyl-2,2,6,6-tetramethylpiperidine-4-yl)-acetate, trimellitic acid ester of tri-(2,2,6-tetramethyl-piperidine-4-yl), 1-acryloyl-4-benzyloxy-2,2,6,6-tetramthyl-piperidine, di-(1,2,2,6,6-pentamethyl-piperidine-4-yl)dibutylmalonate, di-(1,2,3,6-tetramethyl-2,6-diethylpiperidine-4-yl)dibenzylmlonate, dimethyl-bis-(2,2,6,6-tetramethylpieridine-4-oxy)-silane, tris-(1-propyl-2,2,6,

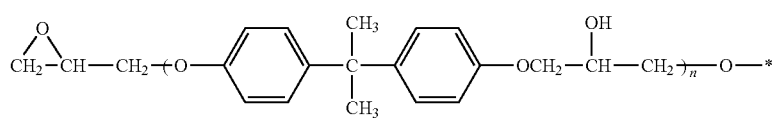

Formula (2)

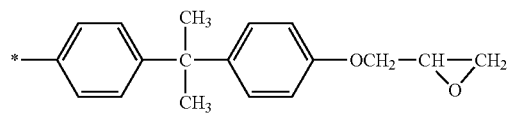

In the above formula, n is an integer of 0-12. Further employable acid scavenger includes those described in Tokkai Hei 5-194788, paragraphs 87 to 105.

(Photo-Stabilizer)

As the photo-stabilizer, a hindered amine photo-stabilizer (HALS) is employable, which is known compound and includes a 2,2,6,6-tetra-alkylpiperidine compound and its acid addition salt and a metal complex thereof, as described in U.S. Pat. No. 4,619,956, columns 5 to 11 and U.S. Pat. No. 4,839,504, columns 3 to 5. Such the compounds include a compound represented by Formula (3).

6-tetramethylpieridine-4-yl)phosphite, tris-(1-propyl-2,2,6,6-tetramethylpieridine-4-yl)phosphate, N,N'-bis-(2,2,6,6-tetramethylpieridine-4-yl)-hexamethylene-1,6-diacetoamide, 1-acetyl-4-(N-cyclohexylacetamido)-2,2,6,6-tetramethylpieridine, 4-benzylamino-2,2,6,6-tetramethylpieridine, N,N'-bis-(2,2,6,6-tetramethyl pieridine-4-yl)-N,N'-dibutyl-adipamide, N,N'-bis-(2,2,6,6-tetramethylpieridine-4-yl)-N,N'-dicyclohexyl-(2-hydroxypropylene), N,N'-bis-(2,2,6,6-tetramethyl-pieridine-4-yl)-p-xylenediamine, 4-(bis-2-hydroxyethyl)-amino-1,2,2,6,6-pentamethylpiperidine, 4-methacrylamido-1,2,2,6,6-pentamethylpiperidine and methyl α-cyano-β-methyl-β-[N-2,2,6,6-tetramethylpieridine-4-yl)]-amino-acrylate.

Preferable hindered amine photo-stabilizer includes the following HALS-1 and HALS-2.

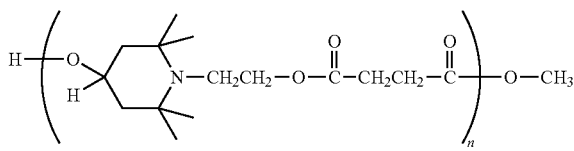

HALS-1)

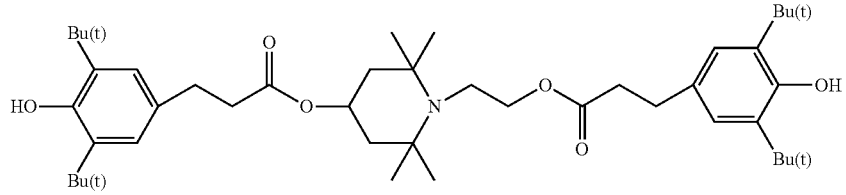

HALS-2)

These hindered amine photo-stabilizers may be employed solely or in combination of two or more kinds thereof. The hindered amine photo-stabilizer may be employed together with the additives such as the plasticizer, acid scavenger and UV absorbent, and may be introduced into a part of the structure of the additive. Though the adding amount of the photo-stabilizer is suitably decided within the range in which the object of the invention is not disturbed, and is preferably from 0.01 to 10%, more preferably from 0.01 to 5%, and particularly preferably from 0.05 to 1%, by weight.

<Dye>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Preferable substituents are an aniline group, a hydroxyl group, an amino group, a nitro group and a hydrogen atom. Blue dyes disclosed in JP-A 2001-154017, paragraph numbers [0034]-[0037], specifically, anthraquinone dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Engineering Co., Ltd., is preferably used.

<Manufacturing Method of Retardation Film>

The manufacturing method of the cellulose ester retardation film of the present invention will now be explained.

The manufacturing method of the retardation film of the present invention contains the processes of (i) a dope preparing process in which cellulose ester and an additive, for example, above mentioned plasticizer, are dissolved in a solvent, (ii) a flow-casting process in which a dope is flow-cast on a belt-like or a drum-like metal support, (iii) a drying process in which a flow-cast dope is dried to form a web, (iv) a peeling process in which a dried web is peeled from the metal support, (v) a stretching process, (vi) a further drying process, (Vii) a heat treatment process and (viii) a winding process of the cooled cellulose ester film. The retardation film of the present invention preferably contain 70-95%, by weight of cellulose ester based on the weight of solid component of the retardation film.

The dope preparation process will now be explained. In the dope preparation process, a higher content of cellulose ester in the dope is preferable since duration of the drying process following the flow-casting process is shortened, however, a too high content may result in loss of filtration accuracy. Preferable content of cellulose ester is from 10-35% by weight and more preferably from 15-25% by weight.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester alone. Sometimes, a solvent works as a good solvent of a cellulose ester, and sometimes as a poor solvent depending on the average acylation degree (degree of acyl substitution) of the cellulose ester. For example, acetone is a good Solvent for an acetic ester of cellulose of which the acetylation degree is 2.4, as well as for cellulose acetatepropionate, however, it is a poor solvent for cellulose acetate of which acetylation degree is 2.8.

Example of good solvents used in the present invention include: an organic halide (such as methylene chloride), dioxolane, acetone, methyl acetate and methyl acetoacetate, of these, methylene chloride and methyl acetate are specifically preferable. However, the present invention is not specifically limited thereto.

Examples of poor solvents used in the present invention include: methanol, ethanol, n-butanol, cyclohexane and cyclohexanone, however, the present invention is not specifically limited thereto. A dope may preferably contain from 0.01 to 2 percent by weight of water.

In the process of preparing a dope, cellulose ester is dissolved using a common method. Dissolving cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperature is higher than the ambient pressure boiling point of the mixed solvents, and simultaneously the temperature is in the range where the mixed solvents do not boil under the applied higher pressure. The following dissolving method is also preferable, in which cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high. The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose ester is successfully dissolved in solvents such as methyl acetate.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, specifically, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicols state, illuminated with a light from one side and observed from the other side. The number of luminescent foreign materials of larger than 0.01 mm in diameter is preferably less than 200 per cm$^2$, more preferably less than 100 per cm$^2$ and still more preferably from 0 to 10 per cm$^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting process. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is appropriately determined in the range of 0-100° C., however, preferably 5-30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, in order to avoid the lowering of the web temperature due to latent heat of evaporation, the air temperature should be higher than the desired temperature of the support while avoiding foaming of the web. Drying process of the web is preferably carried out effectively by changing the temperatures of the warm air and the support during the process between flow-casting and peeling.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically more preferably 20-30% by weight or 60-130% by weight.

The residual solvent content of the web is defined by the following formula:

Residual solvent content(% by weight)=$\{(M-N)/N\} \times 100$ where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases below not more than 0.5%.

The peeled web is generally dried by a roll drying method (the web is passed through many rolls alternately provided up and down in a staggered array), or by a tenter method in which both edges of the web are clipped while the web is being transported.

The web may be stretched in the film transportation direction by a peeling tension or by a transporting tension when or after the web is peeled from the support. The web is preferably peeled from the support with a tension of 210 N/m or more and more preferably with a tension from 220 to 300 N/m in order to stretch the film in the film transportation direction just after peeling.

An example of the stretching process (also referred to as the tenter process) of the present invention will now be explained using FIG. 2.

Figure 2:
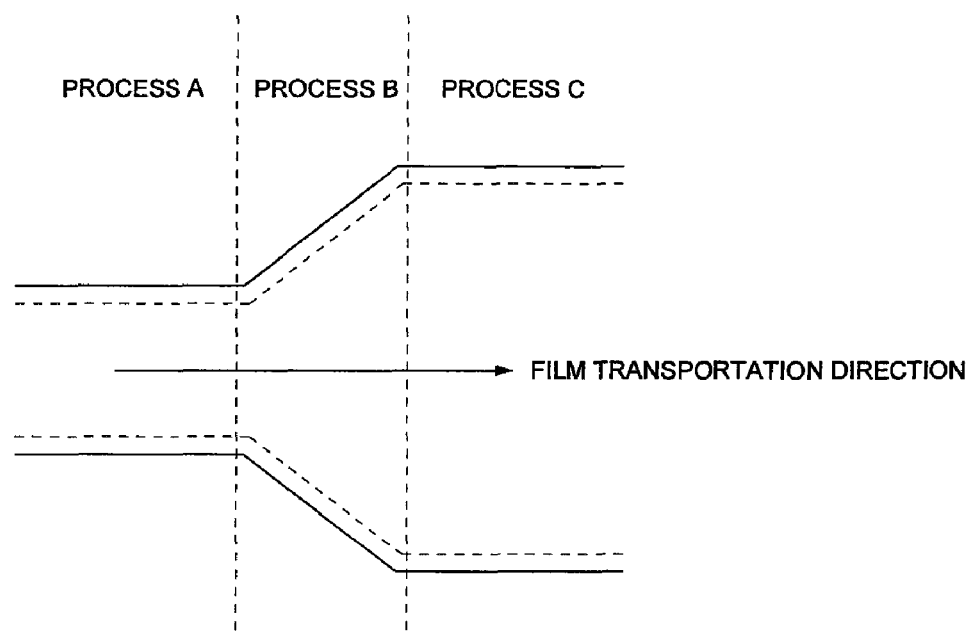
FIG. 2 is the schematic view showing a typical example of a tenter process used in the present invention.

Process A of FIG. 2 is the process where a web conveyed from the peeling and transporting process (not illustrated, hereafter referred to as Process D0) is held by clipping both edges. In Process B, the film is stretched in the lateral direction (perpendicular to the film transportation direction) with the stretching angle illustrated in FIG. 1. In Process C, stretching is completed and the film is transported to the next production process while being clipped.

A slitter which trims both edges of the film is preferably provided at any position between just after the web is peeled and just after Process B or C. Specifically preferably, a slitter is provided just before Process A. When a stretching was carried out under the same condition, a stretched film which is slit before Process B showed an improved orientation angle distribution of slow axes than a stretched film without slitting.

This may be because an undesirable stretching in the film transportation direction is suppressed between the peeling process and Process B where the film still contains much solvent.

In the tenter process, a different temperature domain may be purposely provided in the film to improve the orientation angle distribution. Also a neutral domain is preferably provided between two different temperature domains to prevent interference.

The stretching process may be divided into several steps. Biaxial stretching in both film transportation direction and the lateral direction is also preferable. Biaxial stretching may be carried out simultaneously or in series of steps. In stepped stretching, stretching may be carried out alternately in different directions or stepwise in one direction. Stretching alternately in different directions may also be added to the sequence of stepped stretching in one direction. Namely, the following stretching steps are also employable.

(i) Stretching in the film transportation direction followed by simultaneously stretching in the lateral direction and in the film transportation direction; and (ii) Stretching in the film transportation, direction followed by stretching in the lateral direction while the film is shrunk in the film transportation direction.

It is specifically preferable that the peeled web is stretched in the film transportation direction while the web still contains much residual solvent, followed by stretching the web in the lateral direction by holding both edges of the web using pins or clips in the tenter process whereby, a prescribed retardation value is provided to the web. Also, it is deduced that this process enables control of the free volume radius. The stretching may be carried out only in the lateral direction or simultaneously in the lateral direction and the film transporting direction (biaxial stretching). The stretching ratio of the web in both the directions is preferably 1.05-2 and more preferably 1.15-1.5. The web may be shrunk in the film transportation direction when it is stretched in the lateral direction, where the stretching ratio is preferably 0.8-0.99 and more preferably, 0.9-0.99. The enlarging ratio of the area of the web after stretching (or shrinking) in the lateral direction and in the film transportation direction is preferably 1.12-1.44 and more preferably 1.15-1.32. The enlarging ratio of the area of the web is obtained by (stretching ratio in the lateral direction)×(stretching ratio in the film transportation direction).

The term "stretching direction" used in the present invention usually represents the direction in which stretching tension is applied, however, when a web is biaxially stretched in a plurality of steps, the "stretching direction" may mean the direction in which the final stretching ratio of the web becomes larger (which is usually the slow axis direction) than the stretching ratio in the direction perpendicular to the above mentioned direction.

It is well known that, when a web is stretched in the lateral direction of the web, the dispersion of orientations of slow axes (hereafter referred to as a orientation angle dispersion) becomes larger. In order to conduct stretching in the lateral direction of a web while the ratio of Rt to Ro is kept constant and the orientation angle dispersion is kept small, relationships among web temperatures of processes A, B and C exist, namely, the following relationships are preferably satisfied: $Ta \leq (Tb-10)$, or $Tc \leq Tb$, and more preferably the both relationships are simultaneously satisfied: $Ta \leq (Tb-10)$ and $Tc \leq Tb$, wherein Ta, Tb and Tc represents temperatures in Celsius at each end of Processes A, B and C, respectively.

In order to decrease the above mentioned orientation angle dispersion, the temperature increasing rate of the web in Process B is preferably 0.5-10° C./s.

The stretching duration in Process B is preferably shorter, however, a lower limitation of the stretching duration may be prescribed to maintain uniformity of the web. The temperature of Process B is preferably 40-180° C., and more preferably 100-160° C.

In the tenter process, the coefficient of heat transfer may be constant or may be changed. The heat transfer coefficient is preferably in the range of $41.9 \times 10^3$–$419 \times 10^3$ J/m² h, more preferably $41.9 \times 10^3$–$209.5 \times 10^3$ J/reh, and further more preferably $41.9 \times 10^3$–$126 \times 10^3$ J/m² hr.

The stretching rate in the lateral direction in Process B may be constant or may be changed. The stretching rate is preferably in the range of 50-500%/minute, more preferably 100-400%/minute, and most preferably 200-300%/minute.

In the tenter process, the distribution of environmental temperature in the lateral direction of the web is preferably smaller to improve uniformity of a web. The distribution of environmental temperature in the lateral direction in the tenter process is preferably within ±5° C., more preferably within ±2° C., and most preferably within ±1° C. By decreasing the distribution of environmental temperature, the temperature distribution in the lateral direction of a web may also be decreased.

In Process C, the width of a web held by a tenter is preferably reduced. Specifically, the width is preferably reduced to 95 to 99.5% of the width in the former process.

After a web is treated in the tenter process, a subsequent-drying process (hereafter referred to as Process D1) is preferably provided. The web is preferably subjected to a heat treatment in the temperature range of 50 to 160° C., more preferably, 80 to 140° C., and most preferably 110 to 130° C.

In Process D1, the distribution of environmental temperature in the lateral direction of the web is preferably smaller to improve uniformity of the web. The distribution of environmental temperature in the lateral direction is preferably within ±5° C., more preferably within ±2° C., and most preferably within ±1° C.

Although the tension applied to the web while the film is being transported is affected by several factors, for example: the property of a dope, the amount of residual solvent at the peeling process and Process D0, and the temperature of Process D1, the film tension is preferably 120-200 N/m, more preferably 140-200 N/m, and most preferably 140-160 N/m.

In order to reduce further stretching in the film transportation direction of the film in Process D1, a tension cut roll (an additional roll which reduces the tension of the film while the film is conveyed) is preferably provided.

The means to dry the web is not specifically limited, and, for example, heated air, IR rays, a heated roll and microwave are applicable. With respect to the easiness, heated air is preferable.

The drying temperature in the drying process is preferably increased stepwise in the range of 30-160° C.

In the present invention, the free volume and the free volume parameter are controlled in prescribed ranges by heat treating the web as described above after the drying process of the web.

In the production process of the retardation film of the present invention, the retardation film is preferably subjected to a press treatment with a pressure of 0.5-10 kPa in the thickness direction in the heat treatment process after the drying process. The retardation film is preferably pressed uniformly using, for example nip rolls. When the retardation film is pressed in the thickness direction, the web is preferably thoroughly dried. The free volume and the free volume parameter are controlled by applying pressure of 0.5–10 kPa from both upside and downside of the retardation film. Specifically, two nip rolls arranged in parallel are used, or rolls such as calendar rolls may be used. The temperature in the press treatment is preferably 105-150° C.

Preferably conducted is the trimming of both edges of the film using a slitter after the drying is completed and before winding in a roll, to obtain a roll of the preferable shape. Further, both the edges of the retardation film is preferably subjected to a knurling treatment.

Knurling processing is carried out by pressing a heated emboss roll. Since the emboss roll has a fine convexo-concave surface, by pressing this on the edges of the retardation film, a film having slightly bulky edges.

The depth of the knurling treatment on both the edges of the retardation film are preferably 4-20 μm and the width of the knurling treatment is preferably 5-20 mm.

The knurling processing is preferably provided after the drying process and before the film winding process.

A multilayer retardation film formed by a co-casting method using a plurality of dope solutions is also preferable. The multilayer retardation film can also have a layer containing a plasticizer. The layer containing a plasticizer may be a core layer, a skin layer or both the layers.

The center-line surface roughness (Ra) of the surface of the retardation film of the present invention is preferably 0.001-1 μm.

In the present invention, the retardation film preferably has the Ro value of 30-300 nm under a condition of 23° C. and 55% RH and the Rt value of 70-40 under the same condition, the Ro and Rt values being defined by the following formulas.

$$Ro=(nx-ny)\times d$$

$$Rt=(((nx+ny)/2)-nz)\times d$$

wherein Ro represents an in-plane retardation value; Rt represents an out-of-plane retardation value in a thickness direction; nx represents an in-plane refractive index in a slow axis direction; ny represents an in-plane refractive index in a fast axis direction; nz represents an out-of-plane refractive index in the thickness direction; and d represents a thickness (nm) of the retardation film.

The retardation values Ro, Rt and an angle between the lateral direction of the long sheet film and the slow axis direction θ0 (°) were measured by using an automatic birefringence meter: KOBRA-21ADH (manufactured by Oji Keisokukiki Co., Ltd.) under a condition of 23° C. and 55% RH at a wavelength of 590 nm.

The polarization degree p of the retardation film of the present invention is preferably 0.9990 or more, more preferably 0.9999 or more, still more preferably 0.99995 or more and specifically more preferably 0.99999 or more. The polarization degree p is determined according to the following equation.

$$p=1-\sin^2(2\theta 1)\cdot \sin^2(\pi Ro/\lambda)$$

wherein λ represents a wavelength of 590 nm at which measurement is carried out. θ1 (radian) was converted from θ0 (°).

In order to achieve one of the objects of the present invention, the retardation film to be used for the polarizing plate of the present invention is preferably a film having a thickness of 30-150 μm produced by a casting method with respect to physical strength and productivity of the film. The film thickness is more preferably 40-120 μm.

(Measurement of Transmittance)

Transmittance T was measured as follows: Spectroscopic transmittance τ(λ) was obtained, first, by measuring the transmittance of each sample at wavelengths of every 10 nm in the range of 350-700 nm using a spectrophotometer U-3400 produced by Hitachi Ltd. From the obtained spectroscopic transmittance, transmittances at wavelengths of 380, 400 and 500 nm were evaluated.

The haze of each samples was determined as follows. The haze of the retardation film used in the present invention is preferably less than 1% and more preferably in the range of 0-0.1%.

(Haze Value)

A haze value was determined according to the method of JIS K-6714 using a haze meter (1001DP produced by Nippon Denshoku). The haze value may be used as an index of transparency.

<Antiblocking Layer>

The retardation film of the present invention preferably has an antiblocking layer. An antiblocking layer is formed by coating a layer containing microparticles on the surface of a film and the layer exhibits a minute convex on the surface, which provides a slippery surface. The shape of microparticle is not specifically limited and any shape of microparticles are usable, for example, spherical shape, lod shape, plate-like shape and discotic shape.

Examples of inorganic microparticles include: a metal oxide, a metal hydroxide, a silicate, a carbonate, and a phosphate. Specific examples thereof include: silicon dioxide, titanium dioxide, aluminum oxide, zirconium oxide, calcium carbonate, talc, clay, calcinated caolin, calcinated calcium silicate, tin oxide, indium oxide, zinc oxide, ITO, hydrated calcium silicate, aluminium silicate, magnesium silicate, and calcium phosphate. Microparticles containing silicon is preferable and silicon dioxide is specifically preferable.

These microparticles are available on the marketed with the product names of Aerosil R972, R972V, R974, R812, 200, 200V, 300, R202, OX50 and TT600 (produced by Nippon Aerosil Co., Ltd.), and can be used, for example. Microparticless of zirconium oxide are also available on the market with the product names of Aerosil R976 and R811 (produced by Nippon Aerosil Co., Ltd.). The particles of zirconium oxide are also available on the marketed with the product names of aerosils R976 and R811 (produced by Nippon Aerosil Co., Ltd.). Alternatively, examples of polymer microparticles include: silicone resin microparticles, fluororesin microparticles, and acryl resin microparticles. Of these, silicone resin microparticles, especially three dimensionally networked silicone resin microparticles are preferably used. Examples of silicone resin microparticles include: TOSPERL 103, 105, 108, 120, 145, 3120 and 240, which are manufactured by Toshiba Silicone Co., Ltd.

Of these, Aerosil 200V and Aerosil R972V are specifically preferable, since a higher antiblocking property is obtained while keeping a low haze value. The dynamic friction coefficient is preferably reduced to 0.9 or less and more preferably in the range of 0.1-0.9 by using these antiblocking agents.

The content of microparticles contained in an antiblocking layer is preferably 0.1-50% by weight and more preferably 0.1-10% by weight based on the weight of the binder. The increase in a haze value after providing an antiblocking layer is preferably not more than 1%, more preferably not more than 0.5% and specifically preferably in the range of 0-0.1.

Specifically, an antiblocking layer is formed by coating a composition containing a solvent which dissolves or swells the cellulose ester film. As the solvent, in addition to the mixture of a solvent which dissolves the cellulose ester and a solvent which swells the cellulose ester, a solvent which does not dissolve the cellulose ester may also be added. The mixing ratio of these solvents and the amount of applied coating composition are determined depending on the kind of the resin or degree of the curl of the film. The retardation film of the present invention is favorable because variations in retardation values are suppressed by coating the composition described above.

When the curl of the retardation film is controlled by applying the antiblocking layer, a curl toward the antiblocking layer side surface of the retardation film is effectively caused by increasing the amount of a solvent which dissolves or swells the cellulose ester while decreasing the amount of a solvent which does not dissolve the cellulose ester. The mixing ratio is preferably as follows: (a solvent which dissolves or swells the cellulose ester): (a solvent which does not dissolve the cellulose ester)=10:0-1:9. Examples of a solvent which dissolves or swells a transparent resin film include: dioxane, acetone, methylethyl ketone, N,N-dimethylformamide, methyl acetate, ethylacetate, trichloroethylene, methylene chloride, ethylene chloride, tetrachloroethane, trichloroethane and chloroform. Examples of a solvent which does not dissolve a transparent resin film include: methanol, ethanol, n-propyl alcohol, i-propyl alcohol, n-butanol, cyclohexanol, and hydrocarbons (such as toluene and xylene).

These coating compositions are applied on a transparent resin film preferably in a wet thickness of 1-100 μm or specifically preferably 5-30 μm by using a gravure coater, a dip coater, a reverse coater, a wire bar coater, a die coater, a spray coater or an ink-jet printing. Examples of a binder resin of an antiblocking layer include: vinyl polymers and copolymers, such as, vinyl chloride-vinyl acetate copolymer, a polyvinyl chloride resin, a vinyl acetate resin, vinyl acetate-vinyl alcohol copolymer, partially hydrolyzed vinyl chloride-vinyl acetate copolymer, vinyl chloride-vinylidene chloride copolymer, vinyl chloride-acrylonitrile copolymer, ethylene-vinyl alcohol copolymer, chlorinated polyvinyl chloride, ethylene-vinyl chloride copolymer and ethylene-vinyl acetate copolymer; cellulose derivatives, such as, nitrocellulose, cellulose acetate propionate (preferably the acetylation degrees of 1.8-2.3, the propionyl substitution degree of 0.1-1.0), diacetyl cellulose and cellulose-acetate-butylate; rubber resins, such as, maleic acid-acrylic acid copolymer, acrylic ester copolymer, acrylonitrile-styrene copolymer, chlorinated polyethylene, acrylonirile-chlorinated polyethylene-styrene copolymer, methylmethacrylate-Butadiene-styrene copolymer, an acryl resin, a polyvinyl acetal resin, a polyvinyl butyral resin, a polyester polyurethane resin, a polyether polyurethane resin, a polycarbonate polyurethane resin, a polyester resin, a polyether resin, a polyamide resin, an amino resin, a styrene-butadiene resin, and a butadiene-acrylonirile resin; silicone resins; and fluorine resins. Varieties of homopolymers and copolymers originated from acryl or metacryl monomers are available on the market and a preferable material can be selected from these, for example: Acrypet MD, VH, MF and V (produced by Mitsubishi Rayon Co., Ltd.), Hi Pearl M-4003, M-4005, M-4006, M-4202, M-5000, M-5001 and M-4501 (produced by Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (produced by Mitsubishi Rayon Co., Ltd.)

Specifically preferable are cellulose resins, for example, diacetyl cellulose and cellulose acetate propionate.

An anti blocking layer enables maintaining the flatness of a retardation film, and reducing the variations in retardation values.

<Polarizing Plate>

The polarizing plates of the present invention will now be described.

It is possible to prepare the polarizing plates employing common methods. It is preferable that the retardation film of the present invention is subjected to an alkali saponification treatment and the resulting retardation film is adhered, employing an aqueous solution of completely-saponified polyvinyl alcohol, to at least one surface of a polarizing film which has been prepared by being immersed into an iodine solution and subsequently being stretched. The retardation film of the present invention may also be used for the reverse surface of the polarizing film or other polarizing plate protective film may be used for the reverse surface. Employed as a polarizing plate protective film on the other surface, instead of the retardation film of the present invention, may be commercially available retardation films. For example, preferably employed as commercially available retardation films are KC8UX2M, KC4UX, KC5UX, KC4UY, KC8UY, KC12UR, KC8UCR-3 and KC8UCR-4 (all produced by Konica Minolta Opt, Inc.). Alternatively, it is also preferable to use a polarizing plate protective film having a function of an optical compensating film by containing an optical anisotropic layer, which is prepared by orienting liquid crystal compounds such as a discotic liquid crystal, a rod-shaped liquid crystal, or a cholesteric liquid crystal. It is possible to form the optical anisotropic layer employing the method described in JP-A No. 2003-98348. By employing the combination of an anti-reflection film, it is possible to obtain polarizing plates which exhibit excellent flatness and viewing angle increasing effects.

The polarizing film which is a major constituting component of polarizing plates, as described herein, refers to the element which only transmits the light of a polarized wave in the definite direction. One of the typical polarizing film, which is presently known, is a polyvinyl alcohol based polarizing film which is classified to one prepared by dying polyvinyl alcohol based film with iodine and the other prepared by dying the same with dichroic dyes. The polarizing film is prepared in such a manner that an aqueous polyvinyl alcohol solution is cast and the resulting cast film is subjected to uniaxial orientation and dying, or is subjected to dying and uniaxial orientation and subsequently to a durability treatment employing preferably boron compounds. One surface of the retardation film of the present invention is adhered to the surface of the above polarizing film, whereby a polarizing plate is formed. Adhesion is performed employing preferably water based adhesives containing completely-saponified polyvinyl alcohol as a major component.

A polarizing film is subjected to uniaxial orientation (commonly in the longitudinal direction). When a polarizing plate is allowed to stand at high temperature and high humidity, the length in the orientation direction (commonly in the longitudinal direction) decreases, while the length in the perpendicular direction (commonly the width direction) increases. As the thickness of a polarizing plate protective film decreases, shrinkage ratio increases, specifically, shrinkage ratio in the longitudinal direction increases. Generally, a polarizing film is adhered to a polarizing plate protective film so that the stretching direction of the polarizing film lies in the casting direction (also referred to as the MD direction (machine direction) or the film transportation direction) of the polarizing plate protective film. Consequently, it is important that when the thickness of the polarizing plate protective film is decreased, elongation and shrinkage ratio in the casting direction of the polarizing film is preferably decreased. The retardation film of the present invention is suitably applied to such a polarizing plate protective film due to its excellent dimensional stability.

Namely, in a durability test of the retardation film of the present invention under the condition of 60° C., 90% RH, wavy unevenness of the film does not appear. Also a polarizing plate having a retardation film of the present invention on the rear surface exhibits a wide viewing angle even after the durability test resulting in providing an excellent visibility.

It is also possible to constitute a polarizing plate by adhering a protective film on one surface of the polarizing plate and a separate film on the reverse surface. The protective film and the separate film are employed to protect the polarizing plate at its shipping and product inspection. In this case, the protective film is adhered to protect the surface of the polarizing plate on the surface reverse to the surface which is adhered to a liquid crystal cell. On the other hand, the separate film is employed to cover the adhesion layer to adhere to the liquid crystal cell and is provided on the surface to adhere the polarizing plate to a liquid cell.

In the conventional polarizing plate producing process, the retardation values may have changed for each production line. Although the reason is not specified, it seems that a configuration of the rolls in a transportation process or a film transportation condition affect the retardation values. Moreover, even in the same line, changes of setting or changes with the lapse of time in, for example, saponification temperature and duration, alkali concentration, pH, drying temperature, adhering velocity, film tension in the transportation process and adhering pressure of the films may have affected the retardation values. Basically, these conditions should not be changed, however, when foam in the dope, machine trouble or wrinkles on the film are found, change in line speed and other slight changes in various conditions accompanying the change in line speed are occasionally carried out. Alternately, when the polarizing plate protective film provided on the reverse surface of a polarizing plate is changed, the above conditions may also be changed. Further, when the production lined is stopped due to a trouble of some kind and then started again, it takes much time until the stable production is recovered. So far, the retardation values of the retardation film tends to have been affected by the above mentioned slight changes in setting, anti-trouble measures and changes due to the lapse of time, however, by employing the retardation film of the present invention, a polarizing plate exhibiting a smaller variation in retardation values in spite of the changes in the production condition has been obtained. Using this polarizing plate, an LCD exhibiting a high display quality has been obtained. Specifically, even in LCDs using a LED direct illumination backlight unit provided behind the liquid crystal cell, LCDs uniform in quality, exhibiting high front contrast of the display and a small variation in contrast, have been obtained.

<Display>

By using the polarizing plate of the present invention, a variety of displays excellent in visibility are provided. The cellulose ester film of the present invention is usable for the liquid crystal displays of various drive modes, such as STN, TN, OCB, HAN, VA (MVA, PVA), and IPS. Of these, preferable is an application of the polarizing plate of the present invention to an VA (MVA, PVA) mode LCD, by which an LCD of 30 inch size or more exhibiting reduced environmental variation of the quality and reduced leakage of light in the peripheral area of the display has been obtained. Specifically, an LCD employing a retardation film of the present invention exhibited reduced environmental variation of the quality and reduced leakage of light in the peripheral area of the display. Also, reducing effects for color unevenness, wavy surface and eye fatigue after a long viewing were obtained.

Although the backlight unit used for the liquid crystal display using the polarizing plate of the present invention may be a sidelight type, a direct illumination type or a combination of both types, preferable is a direct illumination backlight unit provided behind a liquid crystal cell.

A specifically preferable backlight unit include a LED direct illuminating backlight unit for a color LCD provided behind a liquid crystal cell containing Red (R) LEDs, Green (G) LEDs and Blue (B) LEDs, of which peak wavelengths are, for example, 610 nm or more for Red (R), 530±10 nm for Green (G), and 480 nm or less for Blue (B). Examples of Green (G) LED having a peak wavelength in the above range include DG112H (made by Stanley Electric Co., Ltd.), UG1112H (made by Stanley Electric Co., Ltd.), E1L51-3G (made by TOYODA GOSEI CO., LTD.), E1L49-3G (made by TOYODA GOSEI CO., LTD.), NSPG500S (made by Nichia Corp.). Examples of Red (D) LED include FR1112H (made by Stanley Electric Co., Ltd.), FR5366X (made by Stanley Electric Co., Ltd.), NSTM515AS (made by Nichia Corp.), GL3ZR2DICOS (product made from Sharp) and GM1JJ35200AE (product made from Sharp).

Examples of Blue (B) LED include DB1112H (made by Stanley Electric Co., Ltd.), DB5306X (made by Stanley Electric Co., Ltd.), E1L51-3B (made by TOYODA GOSEI CO., LTD.), E1L4E-SB1A (made by TOYODA GOSEI CO., LTD.), NSPB630S (made by Nichia Corp.) and NSPB310A (made by Nichia Corp.).

LEDs of the above three colors may be combined to make a backlight unit or a white LED may be used. Also, direct illumination backlight units are disclosed in, for example, JP-A No. 2001-281656, JP-A No. 2001-305535 in which dot type LED light source is used, and JP-A No. 2002-311412, however, backlight units are not limited thereto.

EXAMPLES

The present invention will now be specifically explained using examples, however, the present invention is not limited thereto.

<Preparation of Dope>

The following material were loaded in turn and sealed in a container and the temperature was raised from 20° C. to 80° C. The loaded materials were stirred in the container at 80° C. for three hours, whereby the cellulose ester was completely dissolved. Then, stirring was stopped and the temperature was lowered to 43° C. Obtained solution was filtered using Filter Paper No. 244 produced by Azumi Filter Paper Co., Ltd to obtain Dope A.

(Preparation of Dope A)

| | |
|---|---|
| Cellulose ester (cellulose acetate propionate; the acetylation degree of 1.9, propionyl substitution degree of substitution 0.8) | 100 weight parts |
| Trimethylolpropane tribenzoate | 5 weight parts |
| Ethylphthalylethyl glycolate | 5 weight parts |
| Silica particles (Aerosil R972V produced by Nippon Aerosil Co., Ltd.) | 0.1 weight parts |
| Methylene chloride | 300 weight parts |
| Ethanol | 40 weight parts |

(Preparation of Dope B)

Dope B was prepared in the same manner as Dope A except that the materials were changed as follows:

| | |
|---|---|
| Cellulose ester (acetylation degree of 2.7) | 100 weight parts |
| Triphenyl phosphate | 10 weight parts |
| Biphenyldiphenyl phosphate | 2 weight parts |
| Silica particles (Aerosil R972V produced by Nippon Aerosil Co., Ltd.) | 0.1 weight parts |
| Methyl acetate | 260 weight parts |
| Ethanol | 80 weight parts |

The dope prepared as above was cast through a casting die kept at 30° C. on a stainless steel endless support kept at 30° C. After the formed web was dried until the amount of residual solvent decreased to 80% by weight, the web was peeled from the support using a peeling roller.

Subsequently, the web was dried in an 70° C. air flow by passing through many rollers placed alternatively up and down in a staggered manner (the transport-drying process), then the both edges of the web were clipped with a tenter and stretched by 1.3 times in the lateral direction at 120° C. The stretched web was further dried in an 105° C. air flow by passing through many rollers placed alternatively up and down in a staggered manner to obtain a film containing residual solvent of 0.3% by weight. The obtained film was heat treated for 15 minutes under a condition of prescribed temperature and rate of atmosphere replacement, then, cooled to ambient temperature and wound in a roller to obtain 20 rolls of long sheet Retardation Film 1 (cellulose ester film) having the following features: thickness of 80 μm, length of 1000 m, in-plane retardation value of Ro=50 (nm) and retardation value in the thickness direction of Rt=130 (nm) (the retardation values were measured at 23° C. under 55% RH at a wavelength of 590 nm).

Retardation Films 2-22 were prepared in the same manner as Retardation Film 1 except that the heat treatment temperature and the rate of atmosphere replacement were changed as shown in Table 1. For each of Retardation Films 4, 5, 7, 8, 10, 12, 19 and 20, a prescribed pressure was applied in the thickness direction of the film using niprollers arranged in many steps in the heat treatment process.

The rate of atmosphere replacement is the number of times replacing the atmosphere of a heat treatment chamber by fresh-air per unit time, provided that the volume of the heat treatment chamber is expressed as V (m³) and the amount of fresh-air sent to the heat treatment chamber is expressed as FA (m³/h).

Rate of atmosphere replacement=$FA/V$(times/h)

Polarizing plates were prepared by providing one of the obtained retardation films on one surface of each polarizing plate as a protective film and providing Polarizing Plate Protective Film C on the reverse surface. Protective Film C will be described below.

<Polarizing Plate Protective Film C>
(Silica Dispersed Diluting Solution C)

| | |
|---|---|
| Aerosil 972V (produced by NIPPON AEROSIL Co., Ltd.) (Mean primary particles diameter of 16 nm, apparent specific gravity of 90 g/l) | 12 weight parts |
| Ethanol | 88 weight parts |

The above materials were mixed and stirred for 30 minutes using a dissolver, followed by dispersing with Manton-Gaulin homogenizer. The resulting solution was mixed with 88 weight parts of methylene chloride while stirring and further dispersed for 30 minutes using a dissolver to obtain Silica Dispersed Diluting Solution C.

(Preparation of In-Line Additive Solution C)

| | |
|---|---|
| TINUVIN 109 (produced by Ciba Specialty Chemicals Inc.) | 11 weight parts |
| TINUVIN 171 (produced by Ciba Specialty Chemicals Inc.) | 5 weight parts |
| Methylene chloride | 100 weight parts |

The above materials were loaded in a sealed reaction vessel and well dissolved by heating and stirring, followed by filtering.

In the resulting solution, 36 weight parts of Silica Dispersed Diluting Solution C was added while the solution was being stirred and stirred for 30 minutes. Further, 6 weight parts of cellulose acetate propionate (acetyl substitution degree of 1.9, propionyl substitution degree of 0.8) was added while stirring and further stirred for 60 minutes. The resulting solution was filtered with polypropylen wound cartridge filter TCW-PPS-1N produced by Advantec Toyo, Ltd. to prepare In-Line Additive Solution C.

(Preparation of Dope C)

| | |
|---|---|
| Cellulose ester (cellulose triacetate prepared from cotton linter: Mn = 148000, Mw = 310000, Mw/Mn = 2.1, acetylation degree: 2.92) | 100 weight parts |
| Trimethylolpropane tribenzoate | 5 weight parts |
| Ethylphthalylethyl glycolate | 5 weight parts |
| Methylene chloride | 440 weight parts |
| Ethanol | 40 weight parts |

The above materials were loaded in a sealed reaction vessel and well dissolved by heating and stirring, and filtered using Filter paper No. 24 produced by Azumi Filter Paper Co., Ltd. to obtain Dope C. Dope C was further filtered in a film forming line using Finemet NF produced by Nippon Seisen Co., Ltd. Also, In-Line Additive Solution C was filtered in an in-line additive solution line using Finemet NF produced by Nippon Seisen Co., Ltd. 100 weight parts of filtered Dope C was mixed with 2 weight parts of filtered In-Line Additive Solution C and throughly mixed using a in-line mixer (Hi-Mixer SWJ produced by Toray Engineering Co., Ltd.), and uniformly cast on a stainless steel belt support of a width of 1800 mm at 35° C. using a belt casting apparatus. The cast film was dried until the residual solvent decreased to 120% on the belt support and peeled from the belt support. The peeled cellulose ester web was further dried at 35° C. and slit into a width of 1650 mm, then, further dried at 135° C. while the web was stretched by 1.1 times using a tenter. The amount of the residual solvent when the tenter stretching was started was 30%.

The drying process was finalized by passing the web through many rolls at 110° C. and 120° C. The web was then slit into a width of 1.4 m and both the edges of widths of 15 mm were subjected to a 10 μm depth of knurling treatment. The web was wound to a core of 6 in. in diameter with initial tension of 220 N/m and final tension of 110 N/m. Thus Polarizing Plate Protective Film C was obtained. The stretching magnification in the film transporting direction of the web just after the web was peeled from the belt support was 1.07, which was estimated from the velocity of the stainless steel belt support and the driving velocity of the tenter. The amount of residual solvent of obtained Polarizing Plate Protective Film C was 0.3%, the average thickness was 80 μm and the length was 1000 m.

<Saponification of Retardation Films>

Each of the 20 rolls of each of Retardation Films 1-22 was subjected to a saponification treatment described below by transporting the film using rollers.

<Alkali Saponification Treatment>

Saponification process: in 2M-NaOH at 50±3° C. for 1.5 minutes;

Washing process: in water at 30±3° C. for 1 minute;

Neutralization process: in 10 wt % HCl at 30±3° C. for 1 minute; and

Washing process: in water at 30±3° C. for 1 minute

The saponification process was followed by the washing process, the neutralization process, the further washing process and, finally, a drying process at 90° C.

The head portion and the tail portion of each of the 20 long sheet rolls were sampled before and after the saponification treatment to obtain in total 40 specimens for each of Retardation Films 1-22 before and after the saponification treatment. The measurement of retardation values were carried out for each specimen and, by averaging the 40 data, the difference in each retardation value before and after the saponification treatment and the fluctuation of each retardation value over the 40 specimens after the saponification treatment. The same measurement was repeated for each of Retardation films 1-22. When the variation in each retardation value after the saponification treatment is not more than ±3%, the retardation film is suitable for practical use.

Retardation values Ro and Rt were measured by using an automatic birefringence meter: KOBRA-21ADH (manufactured by Oji Keisokukiki Co., Ltd.) at 23° C. under 55% RH, at a wavelength of 590 nm.

(Preparation of Polarizing Plate)

Subsequently, each of the above 40 retardation plates and saponified Polarizing Plate Protective Film C were adhered on both surfaces of a polarizing film prepared by the method described below to obtain 40 polarizing plates.

Process 1: Saponifying each of the retardation films and Polarizing Plate Protective Film C according to the method described above.

Process 2: Immersing the following polarizing film for 1-2 seconds into a solution containing polyvinyl-alcohol adhesive agent of which solid content is 2 wt % by weight.

Process 3: Removing the excess adhesive agent of each polarizing film formed in Process 2 by lightly wiping and laminating the polarizing film between the retardation film and Polarizing Plate Protective Film C treated in Process 1.

Process 4: Adhering the retardation film, the polarizing film and Polarizing Plate Protective Film C laminated in Process 3 by pressing the films with a tension of 20-30 N/cm$^2$ while the films are transported with a speed of about 2 m/min.

Process 5: Drying the films adhered in Process 4 in an oven heated at 80° C. for 5 minutes to obtain the polarizing plates.

A polyvinyl alcohol film having thickness of 120 μm was uniaxially stretched at 110° C. with a stretching ratio of 5, which was then immersed in an aqueous solution of 0.075 g of iodine, 5 g of potassium iodide and 100 g of water for 60 seconds. The resulting film was further immersed into an aqueous solution of 6 g of potassium iodide, 7.5 g of boric acid and 100 g of water at 68° C., followed by washing with water and drying to obtain a polarizing film.

(Fabrication of Liquid Crystal Display (LCD))

Using the 40 sets of obtained polarizing plates, 40 LCDs were fabricated by adhering each set of the polarizing plate on the glass panels on both surfaces of a liquid crystal cell and providing a LED direct illumination backlight unit provided behind the liquid crystal cell. Thus obtained LCDs (VA mode, 37 inch size) were subjected to a durability test under a condition of 60° C., 90% RH for 1000 hours, and then front contrast of each LCD was measured using EZ-Contrast produced by ELDIM. When the highest contrast value among those of the 40 LCDs was set to 100, number of LCDs exhibiting a contrast value in the range of 90-100 was counted and evaluated according to the following criteria. From the results, the LCDs in which polarizing plates of the present invention were employed were found to exhibit uniform contrast values resulting in providing uniform LCDs.

A: 39-40 LCDs in 40 LCDs
B: 37-38 LCDs in 40 LCDs
C: 35-36 LCDs in 40 LCDs
D: 33-34 LCDs in 40 LCDs
E: 32 LCDs or less in 40 LCDs The polarizing plate which gives the evaluation of C or better is suitable for practical use.

The above results were summarized in Table 1.

TABLE 1

| *1 | Dope | *2 | *3 | *4 | Stretch temperature (° C.) | Stretch ratio | Free volume radius (nm) | Free volume parameter | *5 | *6 | *7 | *8 | Front contrast of display | Remarks |
|---|---|---|---|---|---|---|---|---|---|---|---|---|---|---|
| 1 | A | 105 | 12 | — | 120 | 1.3 | 0.310 | 2.0 | −2 | −3 | ±3% | ±3% | C | Inv. |
| 2 | A | 110 | 15 | — | 120 | 1.3 | 0.305 | 1.9 | −1 | −2 | ±2% | ±2% | B | Inv. |
| 3 | A | 120 | 15 | — | 120 | 1.3 | 0.301 | 1.9 | −1 | −2 | ±2% | ±2% | B | Inv. |
| 4 | A | 125 | 15 | 1 | 120 | 1.3 | 0.285 | 1.4 | 0 | 0 | less than ±1% | less than ±1% | A | Inv. |
| 5 | A | 125 | 25 | 5 | 120 | 1.3 | 0.275 | 1.2 | 0 | 0 | less than ±1% | less than ±1% | A | Inv. |
| 6 | A | 130 | 25 | — | 120 | 1.3 | 0.301 | 1.9 | −1 | −1 | ±2% | ±1% | B | Inv. |
| 7 | A | 130 | 25 | 3 | 120 | 1.3 | 0.280 | 1.7 | 0 | 0 | less than ±1% | less than ±1% | A | Inv. |
| 8 | A | 135 | 25 | 10 | 120 | 1.3 | 0.250 | 1.0 | 0 | 0 | less than ±1% | less than ±1% | A | Inv. |
| 9 | A | 140 | 15 | — | 120 | 1.3 | 0.295 | 1.9 | −1 | −1 | ±2% | ±1% | B | Inv. |
| 10 | A | 145 | 15 | 1 | 120 | 1.3 | 0.271 | 1.5 | 0 | 0 | less than ±1% | less than ±1% | A | Inv. |
| 11 | A | 150 | 20 | — | 120 | 1.3 | 0.308 | 1.9 | −1 | −1 | ±2% | ±1% | B | Inv. |
| 12 | A | 150 | 35 | 1 | 120 | 1.3 | 0.295 | 1.8 | 0 | −1 | less than ±1% | less than ±1% | A | Inv. |
| 13 | A | 155 | 45 | — | 120 | 1.3 | 0.310 | 1.9 | −2 | −3 | ±3% | ±3% | C | Inv. |

TABLE 1-continued

| *1 | Dope | *2 | *3 | *4 | Stretch temperature (° C.) | Stretch ratio | Free volume radius (nm) | Free volume parameter | *5 | *6 | *7 | *8 | Front contrast of display | Remarks |
|---|---|---|---|---|---|---|---|---|---|---|---|---|---|---|
| 14 | A | 100 | 15 | — | 120 | 1.3 | 0.315 | 2.2 | −4 | −7 | ±5% | ±5% | E | Comp. |
| 15 | A | 100 | 10 | — | 120 | 1.3 | 0.320 | 2.2 | −5 | −9 | ±7% | ±6% | E | Comp. |
| 16 | A | 110 | 10 | — | 120 | 1.3 | 0.312 | 2.2 | −4 | −6 | ±5% | ±5% | E | Comp. |
| 17 | A | 150 | 10 | — | 120 | 1.3 | 0.311 | 2.2 | −4 | −7 | ±6% | ±5% | E | Comp. |
| 18 | A | 160 | 20 | — | 120 | 1.3 | 0.312 | 2.3 | −4 | −6 | ±5% | ±5% | E | Comp. |
| 19 | B | 125 | 25 | 1 | 120 | 1.3 | 0.298 | 1.7 | −1 | −3 | ±2% | ±3% | B | Inv. |
| 20 | B | 135 | 25 | 3 | 120 | 1.3 | 0.300 | 1.6 | −1 | −3 | ±2% | ±3% | B | Inv. |
| 21 | B | 100 | 10 | — | 120 | 1.3 | 0.325 | 2.2 | −6 | −10 | ±6% | ±5% | E | Comp. |
| 22 | B | 160 | 10 | — | 120 | 1.3 | 0.315 | 2.3 | −5 | −9 | ±5% | ±5% | E | Comp. |

*1: Cellulose ester film No.,
*2: Treatment temperature (° C.),
*3: Atmosphere replacement rate (times/h);.
*4: Treatment pressure (kPa)
*5: Ro change before and after saponification,
*6: Rt change before and after saponification,
*7: Ro distribution after saponification,
*8: Rt distribution after saponification
Inv.: Inventive Sample, Comp.: Comparative Sample From the results shown in Table 1, the retardation film having a free volume radius and a free volume parameter lying within the ranges of the present invention, which was obtained by controlling the heat treatment temperature after the drying process, the rate of atmosphere replacement and the pressure in the press treatment, provides a polarizing plate and a LCD exhibiting small changes in Rt and Ro values before and after the saponification and small fluctuations in Rt and Ro values in the retardation films.

What is claimed is:

1. A method of manufacturing a polarizing plate comprising the steps of:
    (i) casting a dope containing a plasticizer and a cellulose ester on a support to form a web;
    (ii) peeling the web from the support;
    (iii) stretching the web while the web still contains a solvent;
    (iv) further drying the web until an amount of residual solvent decreases to less than 0.3% by weight;
    (v) heat treating the web at 105-155° C. under a rate of atmosphere replacement of 12 times/h or more while the web is transported, to form a retardation film;
    (vi) adhering the retardation film to at least one surface of a polarizing film to form a polarizing plate, wherein
    a free volume radius of the retardation film determined by positron annihilation lifetime spectroscopy is in the range of 0.250-0.310 nm.
2. The method of claim 1, wherein
    a free volume parameter of the retardation film is in the range of 1.0-2.0.
3. The method of claim 1, wherein
    the cellulose ester is an ester of mixed aliphatic carboxylic acids each having 2-22 carbon atoms.
4. The method of claim 1, wherein Ro and Rt defined by the following formulas satisfy the following conditions:
    Ro is in the range of 30-300 nm; and
    Rt is in the range of 70-400 nm,
    wherein $$Ro=(nx-ny)\times d$$

$$Rt=(((nx+ny)/2)-nz)\times d$$

wherein Ro represents an in-plane retardation value; Rt represents an out-of-plane retardation value in a thickness direction; nx represents an in-plane refractive index in a slow axis direction; ny represents an in-plane refractive index in a fast axis direction; nz represents an out-of-plane refractive index in the thickness direction; and d represents a thickness (nm) of the retardation film.

* * * * *